WASTE LIQUOR FROM AMMONIA BASE SULFITE PULPING PROCESS

INVENTOR.
Everett Douglas Cann

WASTE LIQUOR FROM MAGNESIUM BASE SULFITE PULPING PROCESS

INVENTOR.
Everett Douglas Cann

Jan. 3, 1967 E. D. CANN 3,296,064
METHOD OF TREATING CELLULOSIC PULPING WASTE
LIQUORS WITH MAGNESIUM OXIDE TO FORM A
COMPLEX PRIOR TO BURNING THEREOF
Filed May 4, 1965 8 Sheets-Sheet 3

WASTE LIQUOR FROM SODIUM BASE SULFITE PULPING PROCESS

INVENTOR.
Everett Douglas Cann
BY
Wolfe, Hubbard, Voit & Osann
ATTORNEYS

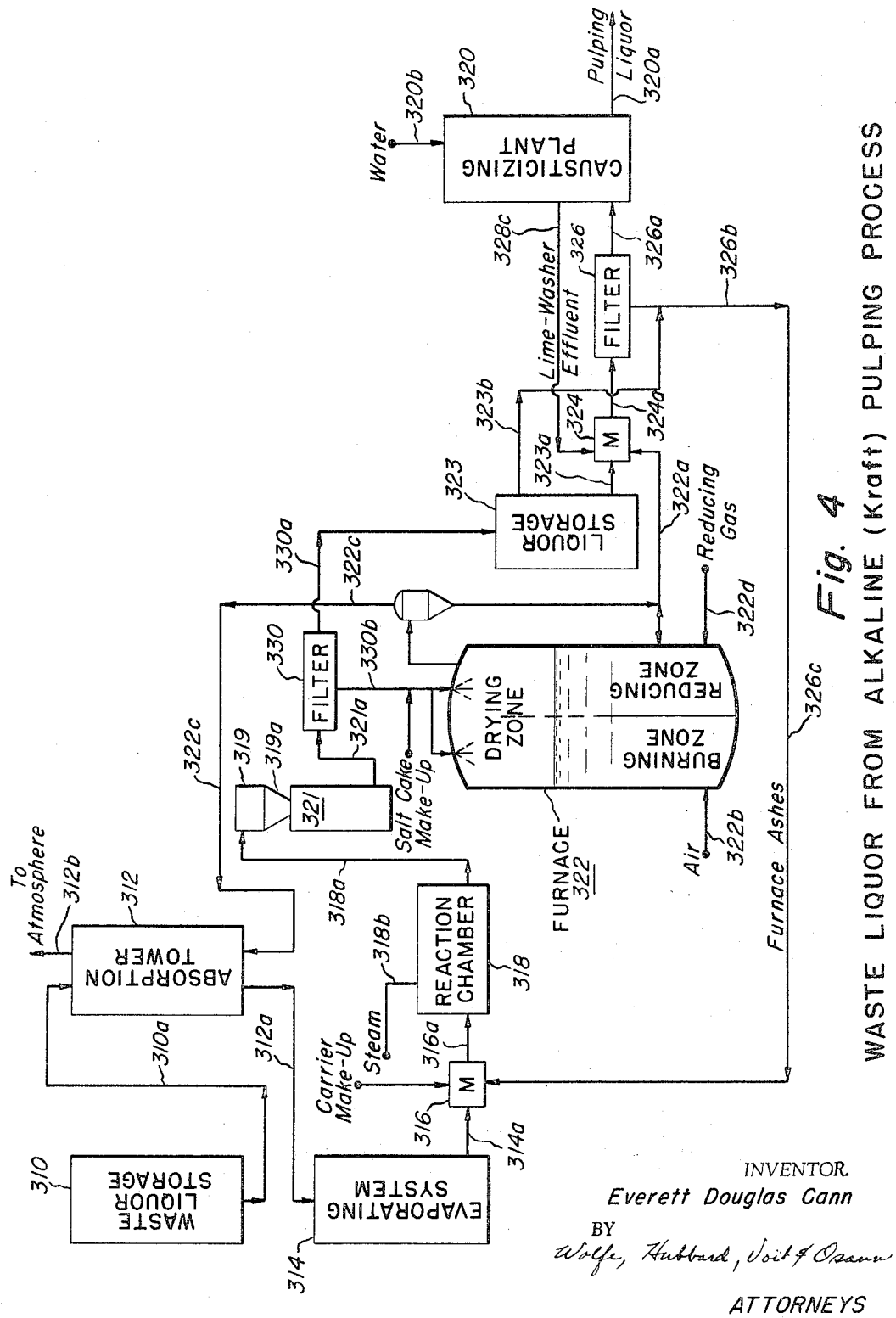

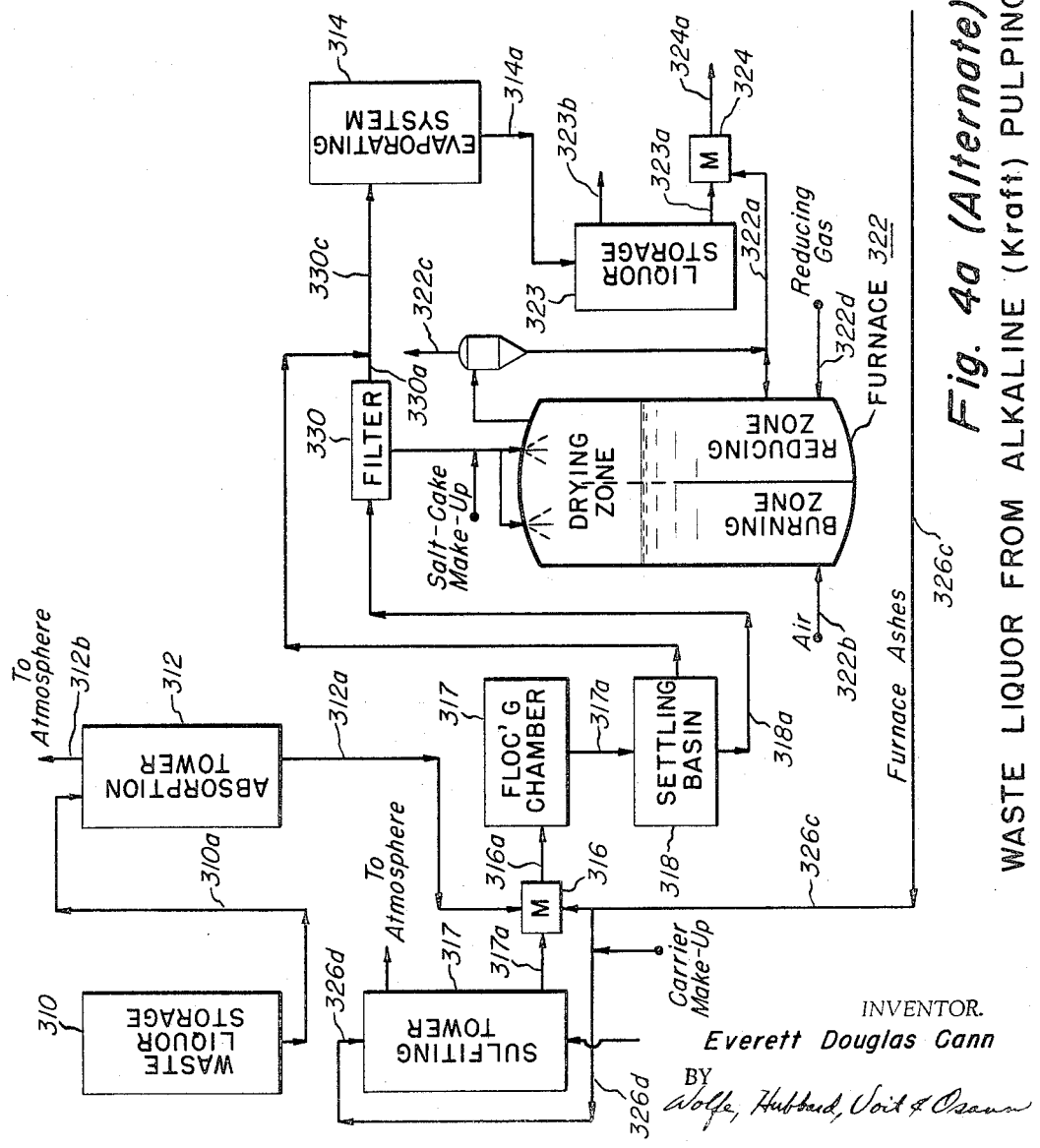

WASTE LIQUOR FROM AMMONIA BASE SULFITE PULPING PROCESS

INVENTOR.
Everett Douglas Cann

ATTORNEYS

WASTE LIQUOR FROM MAGNESIUM BASE SULFITE PULPING PROCESS

WASTE LIQUOR FROM SODIUM BASE SULFITE PULPING PROCESS

United States Patent Office 3,296,064
Patented Jan. 3, 1967

3,296,064
METHOD OF TREATING CELLULOSIC PULPING WASTE LIQUORS WITH MAGNESIUM OXIDE TO FORM A COMPLEX PRIOR TO BURNING THEREOF
Everett D. Cann, Freeport, Ill., assignor of forty percent to William T. Neiman, Freeport, Ill.
Filed May 4, 1965, Ser. No. 453,043
11 Claims. (Cl. 162—36)

This invention relates to the treatment of waste liquors from wood and similar cellulosic pulping operations, and more particularly to a method of recovering cooking chemicals, heat, and process water from such waste liquors.

The manufacture of pulp from wood and similar cellulosic materials involves the chemical digestion of lignin and hemicelluloses which serve to bind the fibers together. In all of the various types of chemical pulping processes, wood chips or other fibrous materials are cooked or digested with chemicals that selectively attack and solubilize lignin and hemicelluloses while preserving the natural forms of the cellulose fibers. These fibers are recovered and formed into sheets or mats, which are dried to form paper and board products.

The active chemicals in pulping liquors or solutions are inorganic compounds of sulphur such as sulfur dioxide or bisulfites and sulfites in the sulfite processes, and sodium hydroxide with or without sodium sulfide in the alkaline processes. Early pulping processes generally employed calcium bisulfite-sulfur dioxide solutions and, because of the low cost of raw materials, namely, lime and sulfur, the waste liquors were simply dumped into nearby streams or lakes. As this practice inevitably caused pollution of natural waters, this method of disposing of waste liquors has been severely limited or curtailed completely. Now, for reasons of pollution control as well as for economics, it is desirable if not essential to treat spent or waste pulping liquors to remove organic materials and to recover reusable pulping chemicals. Indeed, stringent laws against pollution of natural waters and of the atmosphere have made it all but compulsory to treat waste cellulosic pulping liquors to avoid stream contamination and without expelling offensive vapors and particles into the atmosphere.

These requirements of pollution control have directly affected the selection of pulping processes. Alkaline (kraft) and related processes are well able to utilize the recovery of inorganic chemicals for reuse. Efficient recovery units have therefore been developed for the kraft process (sodium hydroxide and sodium sulfide are the active chemicals) and the soda process (sodium hydroxide). Since these recovery units effectively control the pollution of natural waters, alkaline pulping processes have increased in popularity. Furthermore, the kraft process is strongly favored today because of its ability to process all types of woods.

However, alkaline pulps are expensive and are difficult to refine. The calcium base sulfite process too has serious limitations; it does not effectively pulp some of the common woods, such as pine, hemlock, Douglas fir, cedar, etc., and correspondingly its use is not favored. In order to utilize the advantages inherent in the sulfite pulping process, namely, higher pulp yields, brighter unbleached pulps and more readily bleachable pulps, and to permit the processing of all woods, new sulfite processes have been considerably improved during recent years especially by the development of modified processes involving soluble bases such as ammonium, magnesium and sodium in place of calcium. However, due to the higher cost of these soluble bases and to the stringent antipollution laws, it has become necessary to develop recovery processes for these improved sulfite pulping processes. These improvements have placed the sulfite pulping processes on a more favorable basis, but most of the newly developed sulfite liquor recovery units are excessively complicated and expensive for ready acceptance by the pulping industry. Indeed, were it not for antipollution laws, it is questionable whether pulping waste liquor treatment would be used in any but the alkaline kraft-type pulping processes.

Accordingly, a major object of the invention is to provide a pulping waste liquor treatment process for sulfite as well as for alkaline pulping operations offering substantially improved economics with respect to existing treatment processes. To this end, subsidiary objects are to provide waste liquor treatment processes which eliminate or minimize certain expensive operations heretofore characteristic of waste liquor treatment, and which feature improved burning of the waste liquor, and conversion of the chemical residues to active pulping chemicals.

A related object is to provide a waste liquor treatment process which is usable with virtually any type of pulping process, whether the cooking liquor be strongly acid (pH of about 2–4), medium acid (pH 4–6.5), neutral (pH 6.5–8.0), or alkaline (pH 8.0–10.0). In keeping with this object, an important characteristic of the process of the invention is that it may be used to treat waste liquors from any of the foregoing processes and to produce a regenerated cooking liquor usable either with the same process or with a different process. In this connection, it is noted that often a pulp mill will have both a soluble base sulfite pulping operation and an alkaline kraft pulping process. Additionally, another object is to provide a waste cooking liquor treatment process which can simultaneously treat the cooking liquors from different types of cooking processes.

Still another object of the invention is to regenerate cooking chemicals having cooking properties substantially equivalent to those of fresh chemicals. This is accomplished, inter alia, by regulating the waste liquor recovery process such that inert or even deleterious chemicals ordinarily formed as byproducts in many cooking liquor recovery processes are substantially excluded.

An important object is to provide such a process which is capable of substantially avoiding contamination of natural waters and of the atmosphere. Laws introduced by various federal and local governmental bodies in an effort to control the dumping of waste materials into lakes and streams and to avoid expelling noxious gases into the atmosphere have progressed to where pulping operations cannot be built and operated in most industrial countries without an efficient waste recovery or treatment unit. Thus, a feature of the invention is to provide an effective waste recovery and treatment system which avoids or substantially minimizes such contamination.

Yet another object is to provide a waste liquor treatment process which is usable with both large and small pulp mills. Heretofore, the initial expense and operating cost of waste liquor recovery processes have virtually limited the use of such processes to large pulp mills in order economically to justify the cost of modern waste liquor treatment processes. The process of the invention, by maximizing the efficiency of burning operations and by minimizing the need for certain evaporating operations permits the attainment of high thermal as well as economic efficiency in waste liquor treating processes. Accordingly, the invention has as an important objective in the provision of a waste liquor treatment process that may be used with small as well as large pulping operations.

Of particular importance in localities having a water shortage, yet another objective of the invention is to provide a waste pulping liquor recovery process which permits economic and effective reuse of a portion of the waste liquor without passing this portion through the treatment process. Although the resultant liquor may fall somewhat short of providing cooking liquor for the highest quality chemical pulps, it is entirely satisfactory for the manufacture of most types of paper and board pulps.

Another object of the invention is to provide a technique for minimizing conversion of certain pulping chemicals to inert or undesirable forms. By this technique only a portion of the chemicals are exposed to conditions which could cause them to be converted to inactive material, such as the transformation of sodium-sulfur compounds to sodium sulfide and sodium carbonate. This objective has considerable importance when excessively high concentrations of pulping chemicals are used in the pulping operations to shorten pulping times. This condition materially increases the productive capacity of a given digester (cooking vessel) space, but the waste pulping liquors contain large amounts of unconsumed pulping chemical. By the use of this aspect of the invention these chemicals are not subjected to destruction in the furnace. Existing recovery processes have thus far been incapable of providing this advantage.

A further aim of the invention is to provide a waste liquor treating process which is versatile, and which can accommodate changes in the composition and flow rate of waste liquors. In point of fact, a treating process according to the invention may even be adapted or converted to the treatment of waste liquor from an entirely different type of pulping operation from that for which it was originally designed.

Yet a further object is to maximize the production of waste heat by effectively burning organic constituents of the waste liquor without requiring excessive heat consumption by the waste liquor treating process itself. Otherwise stated, a treating process according to the present invention produces a large net amount of heat for use elsewhere in the paper mill.

Other and additional objects, objectives, aims, and advantages of the invention will become apparent from the following specification, which is to be read in conjunction with the attached drawings wherein:

FIGURE 1 schematically depicts a waste liquor treatment process for use with an ammonium base sulfite pulping process;

FIG. 4 is a waste liquor treating process for use with an alkaline (kraft) base sulfite pulping operation;

Briefly, according to the invention, there is added to the waste liquor of a pulping process, or to a partially concentrated waste liquor, a substantial amount of magnesium or calcium oxide carrier, and it is this inorganic carrier together with normally solid but dissolved residues in the waste liquor from the chemical digestion of lignin and hemicellulose that is fed to a suitable furnace for oxidation of the organic materials and for reclamation of the furnace ash containing carrier as the oxide. At least a portion of the carrier is then recycled back to the process.

According to optimum practice of the invention (FIGS. 1–4), the magnesium oxide or calcium oxide (the latter being used only when the cooking liquor is substantially free of sulfites or bisulfites), is added in sufficient amount to form a separable complex with the normally solid components of the waste liquor. This complex is advantageously separated from the waste liquor by a physical solid-liquid separating technique such as filtration, which thereby avoids or minimizes the need to evaporate the liquid as is characteristic with most prior art waste liquor treating processes.

After incorporation of the carrier (chiefly consisting of recycled furnace ashes) with the incoming waste liquor stream the formation of a "complex" between the carrier and the organic residue is promoted by treatment of the mixture in a reaction chamber. In addition, this treatment effects maximum replacement of any ammonium ion and subsequent expulsion of the ammonia gas liberated by the alkaline medium present, polymerizes simple sugars present in the sulfite waste liquors, and promotes the formation of insoluble magnesium or calcium salts of higher molecular weight lignin sulphonic acids by replacing the ammonium or sodium cation.

Figure 5:
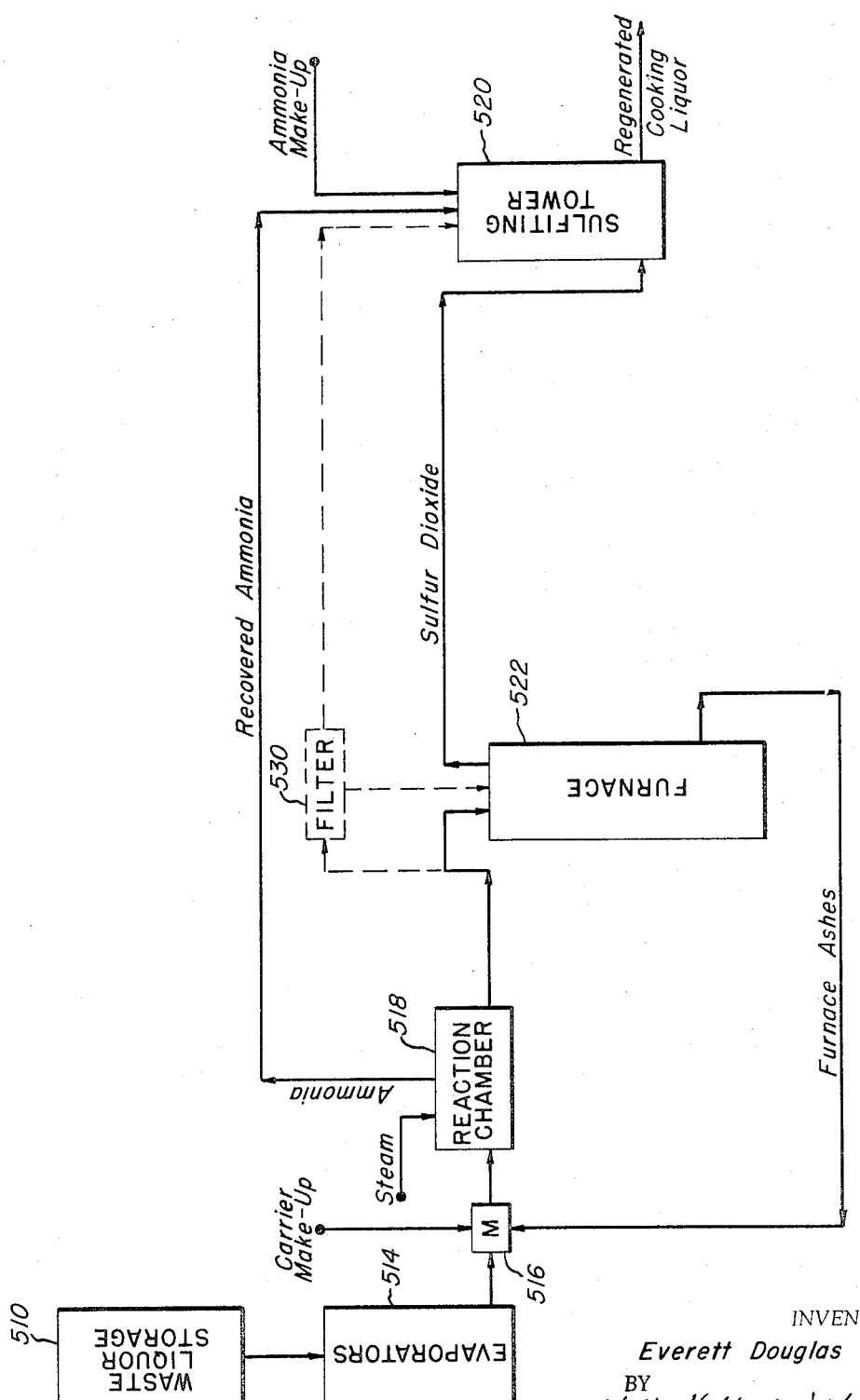
FIG. 5 is an alternative process for treating ammonium base sulfite pulping waste liquor.
Figure 6:
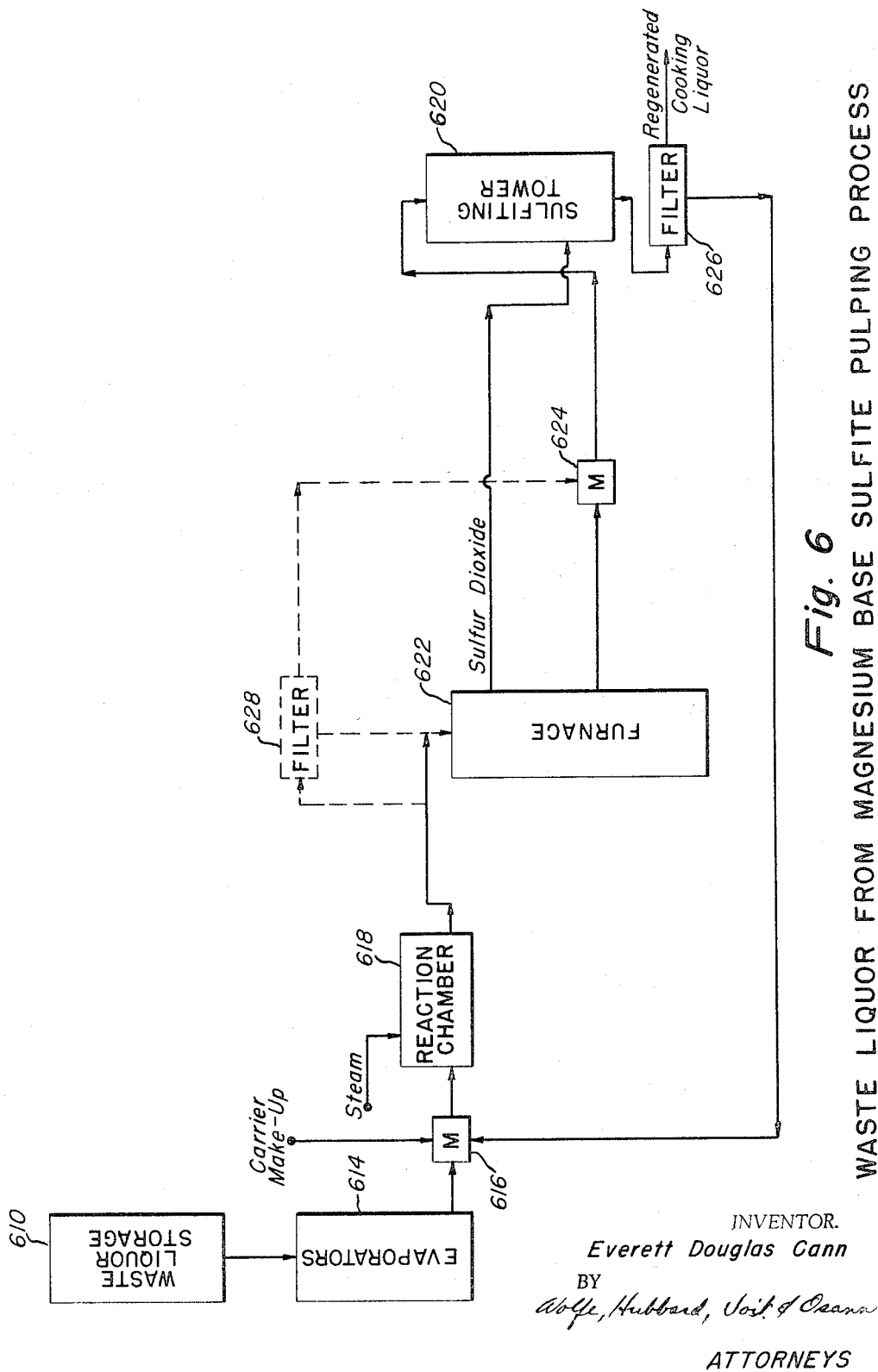
FIG. 6 is an alternative process for treating magnesium base sulfite pulping waste liquor.
Figure 7:
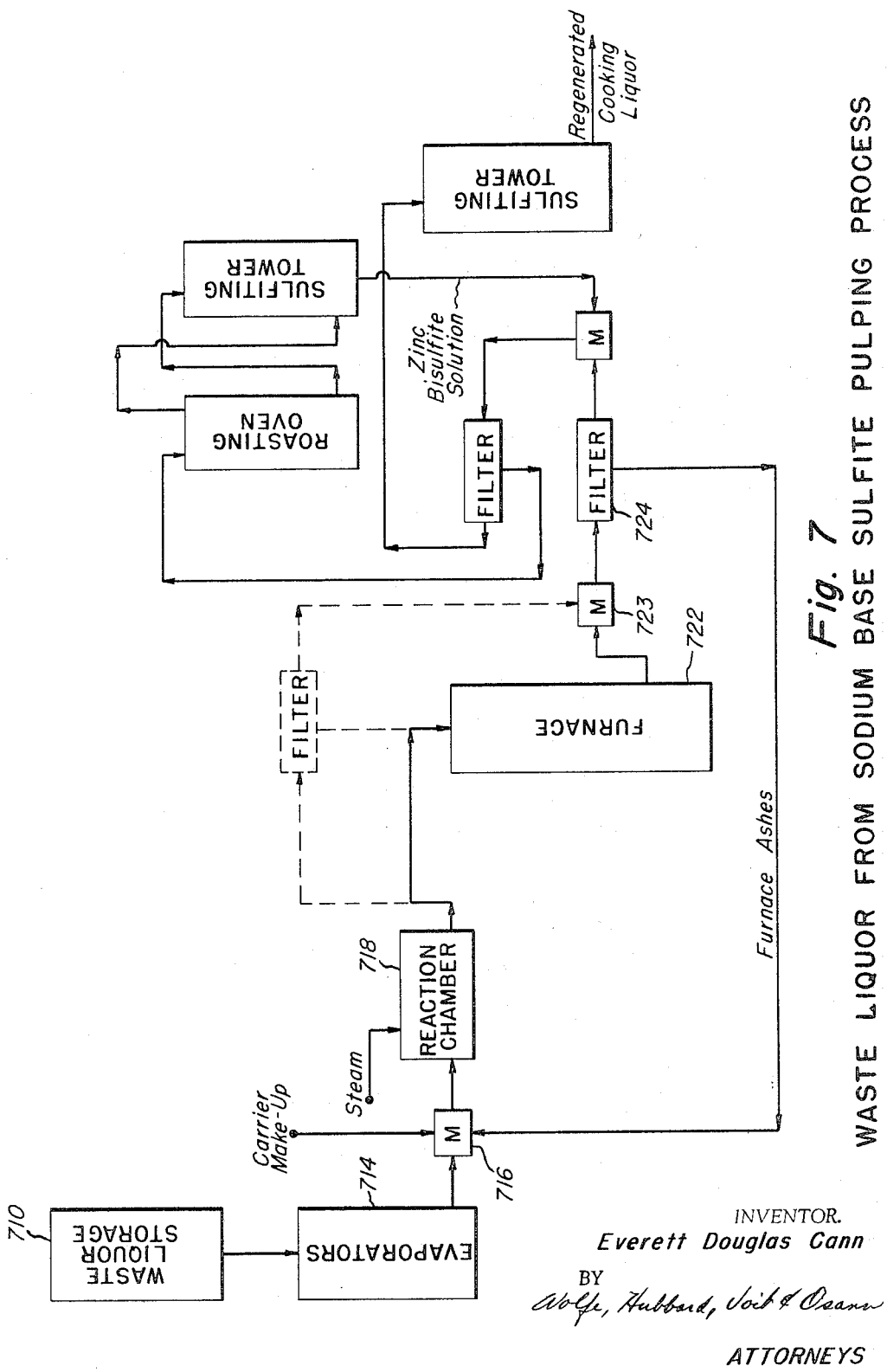
FIG. 7 is an alternative process for treating sodium base sulfite pulping waste liquor.

An optional procedure, illustrated in FIGS. 5–7, is within the scope of this invention and involves the passing of the entire stream including the carrier through the furnace. With this option the waste liquor is commingled with the carrier, fed to a reaction chamber, and the stream from the reaction chamber passed directly into the furnace. It is also possible in this embodiment to eliminate other components of the system, as will be brought out subsequently. While this procedure is simpler than the one described in FIGS. 1–4, it does not permit realization of the full advantages of the invention such as removal of a portion of the water by mechanical means rather than by evaporation, reuse of some of the water from the waste liquor, or bypassing the residual pulping chemicals around the furnace.

In either event the complex is then burned under oxidizing conditions, advantageously in a furnace of the fluidized bed type. Accordingly, and irrespective of whether a fluidized bed furnace is actually used, it is desirable to add sufficient carrier to the waste liquor to produce a solid having such bulk and friability that it may be burned under fluidized bed conditions. To this end, it is desirable that the inorganic content of the total solids in the waste liquor stream be within the range of about 5 or 10 to about 70 weight percent, optimally within the range of about 20–60 weight percent.

The total solid content and percentage of inorganic solids in the liquor stream is best determined experimentally by drying a weighed amount of the liquor to constant weight at about 100° C. The solid residue is weighed and taken as total solids, which may be comprised of magnesium (or calcium) oxide and/or hydroxide, sugars, incompletely hydrolyzed carbohydrates, lignin sulphonic acid salts, and alkaline sulfates, sulfites and/or sulfides, with the detailed composition depending upon the type of pulping operation. An aliquot of this solid material is pulverized and roasted in a furnace at about 800° C. for from two to three hours in an oxidizing atmosphere or until all the organic components are oxidized and the magnesium hydroxide is calcined to magnesium oxide. The roasted material is weighed, and the ratio of this weight to the weight of the total solids multiplied by 100 is taken as the percentage of inorganic solids in the total solids. Chemical analysis of the roasted material for magnesium (or calcium) oxide content permits the determination of magnesium oxide content of the total solids.

It will be appreciated that the total solids content of various streams will in fact represent the total dissolved, precipitated, and colloidally suspended solids in the stream. For example, the waste liquor from a pulping operation may contain as little as 5 or even less percent total solids to as much as 10 or even more percent solids, substantially all of which will be in solution or suspension in the liquor. However evaporation of the liquor will produce a solid residue that is herein termed the "total solids" content of the liquor.

Although the preferred carrier material is magnesium or calcium oxide or a mixture of the two, other inert solids such as alumina, silica, barium oxide, etc., may be substituted in part for the preferred material. Magnesia (magnesium oxide) however possesses the desirable characteristics of readily forming a separable complex with the solids in waste liquor or concentrated waste liquor, and of being regenerable to its original form notwithstanding hydration or the presence of carbonates, sulfides, sulfites, and bisulfites, in the liquor or in the furnace. Additionally, magnesium is inexpensive and, most importantly, can be recycled and reused almost indefinitely.

The carrier may be added to the waste liquor in any form, and reference here to the "oxide" is intended to embrace equivalent forms such as the hydroxide, carbonate, or the like. It will be appreciated that the analysis for inorganic solids provided above refers to MgO or CaO inasmuch as these are the products obtained by roasting under the defined conditions. Additionally, the furnace ashes used as recycle in the inventive process will in fact contain the carrier chiefly in the form of MgO or CaO.

In this invention the carrier functions best under alkaline conditions within the pH range of about 8.5 to 10.0. Accordingly, the waste liquors are preferably adjusted to this pH by controlling the amount of magnesium or calcium oxide. Thus, the basic carrier neutralizes any acids present and also displaces cations such as ammonium and sodium in the waste liquors. However, minor amounts of other basic materials such as the hydroxide or carbonate of sodium or the other alkalis may be used for this function. The amount of base used with a sulfite waste liquor is readily determined by ascertaining the amount required to raise the pH of a given weight of the waste liquor to pH 8.5. The amount required to replace the ammonium ion can be determined by first determining the ammonium present by analytical methods and then calculating the equivalent weight of the reactant. The amount of carrier used can be calculated by subtracting the amount of reactant required from the amount of inorganic compound present as carrier and reactant.

As earlier stated, the process of the invention owes much of its practical and economic success to the separation of dissolved solids from the waste liquor by forming a separable complex with the inert carrier, particularly when the carrier is magnesia. In preexisting processes it was virtually essential to remove substantially all of the water by evaporation so that the concentrated solids could be burned in a furnace without overloading the furnace with large amounts of water that would be converted into steam. However, according to the preferred form of invention, evaporation of the waste liquor may be minimized or even avoided entirely inasmuch as the separable complex of carrier and solids may be removed from the waste liquor stream by a physical solid-liquid separating technique such as ordinary filtration. This feature has manifest advantages in conserving on the heat load, and perforce maximizing the thermal efficiency of a waste liquor treating process.

Furthermore, the process offers significant economics in process water consumption. Since the volumes of pulping liquor and waste liquor of a pulping operation are roughly the same, it follows that if it were not for dilution of the waste liquor at the pulp washers no evaporation would be necessary in the waste liquor recovery process. That is, when mother liquor from the pulp filters or washers is used to prepare the pulping liquor the amount of water removed by evaporation is equal to the amount of dilution of the waste liquors at the pulp washer.

In the examples here presented evaporation is illustrated as the first major step in the process. This need not be the case, as evaporation may be conducted in any stage in the process up to the final sulfiting tower. Actually, several advantages are gained by evaporating the mother liquor from the separation step prior to the furnace. This permits the use of larger volumes and lower concentrations in all steps prior to the slurrying the furnace ashes with waste liquor. Since this requires somewhat larger equipment this technique may in some cases be objectionable but, since low concentrations are desirable when settling basins are used, the evaporation of the mother liquor would be of advantage in this case. Also, it would then be unnecessary to adjust the pH of the mother liquor, as it remains alkaline.

Moreover, the presence of a substantial inorganic content of the total solids passing to the furnace where organic components of the waste liquor are oxidized permits the use of modern efficient fluidized bed furnaces. In the absence of a substantial infusible inorganic content, wastes from a pulping operation would form either a fluffy powdery ash that could not be retained in a fluidized bed, or else would fuse in the presence of sodium compounds to a glassy insoluble clinker that would require special furnaces. However, with an infusible carrier such as magnesium oxide the ash remains as a relatively compact particulate material that neither tends to pass out of the furnace as a dust or fuse to a glassy hard clinker.

The employment of a fluidized bed affords additional advantages, particularly in controlling the combustion process so as to insure substantially complete oxidation of carbonaceous waste material while at the same time avoiding excessive temperatures which would otherwise tend to avoid vaporizing the sodium compound. Thus, although furnaces other than those utilizing a fluidized bed may be used, the full advantages of the invention are not realized in the absence of fluidized bed combustion.

Additionally, where the waste liquor contains a substantial amount of sodium compounds, as for example in a sodium base sulfite pulping operation or in a kraft-type operation, a fluidized bed furnace may be provided which has a zone or section in which a reducing atmosphere is maintained to reconvert sodium sulfate into sodium sulfide. This procedure further enhances the processing attractiveness of invention by permitting almost complete reuse of sulfur compounds.

As stated earlier, the process of the invention may be used in conjunction with waste liquors from a variety of pulping processes. The pulping process may be highly acid, that is, using a cooking liquor having an initial pH within the range of about 1.0–4.0, in which event the active ingredients of the cooking liquor are free sulfur dioxide and the bisulfite ion. Or the cooking liquor may be of the acid sulfite type, in which case the pH is within the range of about 4.0–6.5 and sulfite and bisulfite ions are the active components. In neutral sulfite liquors the pH is originally within the range of about 6.5–8.0, and the predominant active component is sulfite, with some bisulfite present. At pH's within the range of about 8.0–10.0, the so-called alkaline sulfite cooking liquors utilize sulfite and hydroxyl ions as the active ingredients. It is recognized that other chemicals may be present, intentionally or otherwise. For instance, sodium carbonate is commonly used as a buffering agent in the high pH sulfite pulping liquors. The presence of such materials ordinarily does not interfere with the procedures outlined in the examples herein.

With the exception of magnesium base sulfite pulping liquors (the insolubility of magnesium monosulfites permits their use only in strongly and medium acid cooking operations) the soluble base sulfites are commercially found in strong acid, medium acid, neutral, or alkaline ranges, as above defined. Irrespective of the pH and of the nature of the cation, waste cooking liquors from all of the aforesaid processes may be treated according to the invention.

Similarly, the so-called alkaline pulping liquors may be treated by the inventive process. These liquors, instead of utilizing sulfur dioxide, sulfite, or bisulfite, employ sulfide, polysulfides, and/or hydroxides as active cooking chemicals. In any of these processes, as well as any of the sulfite cooking processes, the only difference in treatment is the particulars of reducing the alkalinity by acidifying to pH 8.0–9.5 and of regenerating pulping liquor from the various streams obtained by the treating process of the invention.

Waste liquors from the alkaline (kraft) pulping processes are highly alkaline with pH's ranging from about 10.0 to 12.0. Since such high alkalinity may interfere with the formation of an insoluble carrier-organic matter complex, these liquors are best acidified to a lower alkalinity, e.g., a pH of about 8.0 to 9.5. Since the procedure illustrated in Example 4 below would not permit the conversion of sodium sulfate in the waste liquor to an active pulping chemical, it is generally not considered advisable to acidify the alkaline waste liquors with sulfuric acid. However, if the optional procedure of passing the entire stream through the furnace is used, sulfuric acid may conveniently be used to acidify the waste liquor because the sodium sulfate may be converted in the furnace to an active cooking chemical.

In addition, although the process is primarily concerned with treating unprocessed waste liquors from cellulosic pulping operations, it may also be applied to the treatment of pulping waste liquor which has been subjected to previous treatment. Thus waste liquors from vanillin processes, alcohol plants, etc., using waste liquor as a raw material may be treated by the process herein. Also liquors from which various components have been removed, such as sodium and/or ammonium ions, organic ingredients, etc., may also be treated by the invention.

The invention in its various aspects is exemplified in the following specific examples. It will be appreciated that these are illustrative only, and are not intended to be definitive with respect to scope or exclusive as to conditions.

*Example 1*

This example illustrates the treatment of waste liquor from an ammonium base sulfite pulping process. It typifies the recovery of waste sulfite liquor obtained from a neutral pulping liquor, in which the liquor fed to the digester has a pH within the range of about 6.5 to about 8.0.

Figure 1:
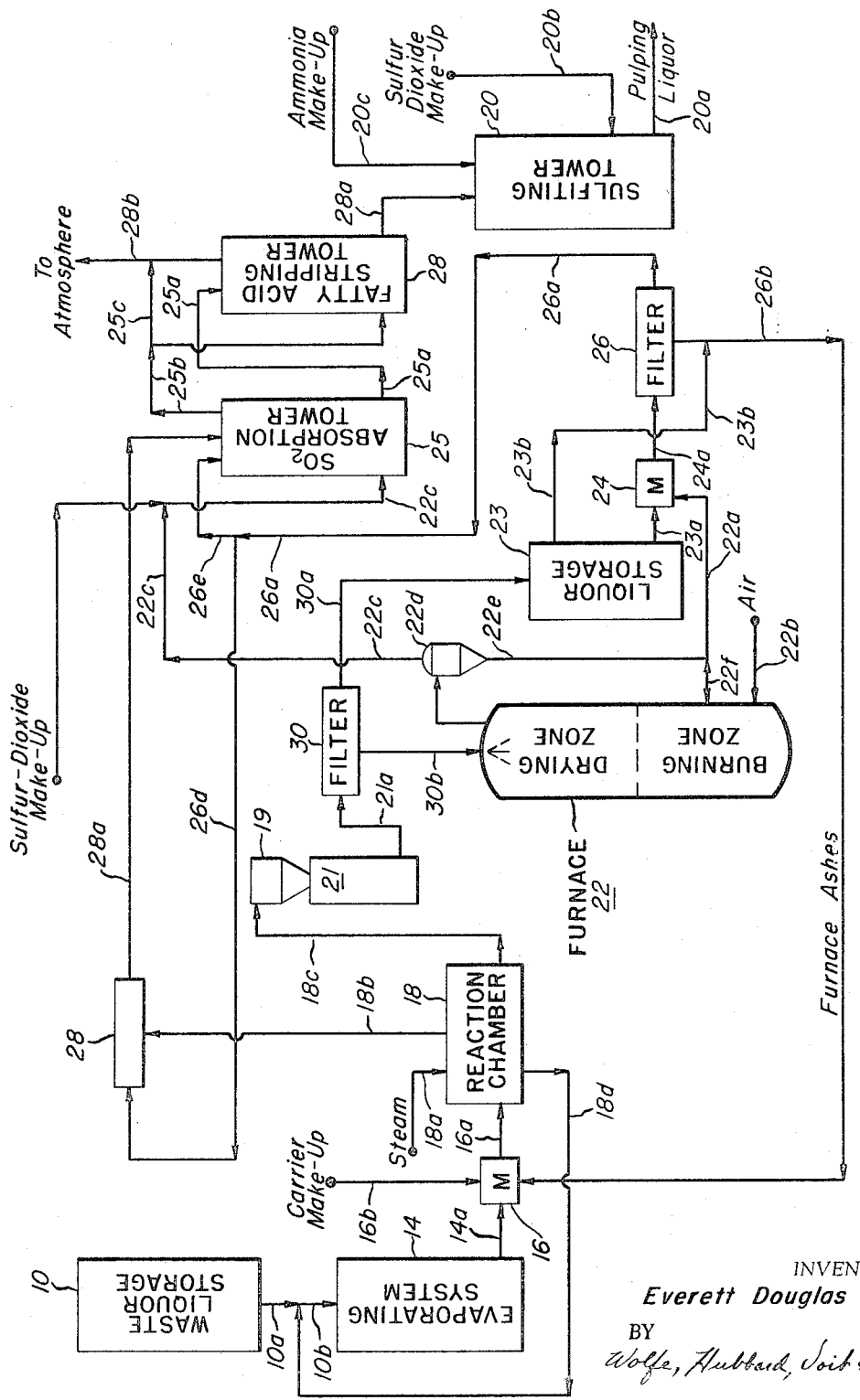

Referring to FIG. 1, waste liquor from the digesters is accumulated in waste liquor storage vessel 10, from which it is transferred via line 10a to the waste liquor recovery system of the invention. For this example, it is assumed that the mill produces 100 tons per day of paper pulp, and employs a wood-to-liquor ratio of 1:3.5 and a dilution ratio at the washers of 1:2.5 (weight ratio). The ammonium sulfite cooking chemicals charge is 20 percent based on bone dry, or moisture free, wood and yields approximately 60 percent pulp based on the wood. For illustrative and computational purposes, it is assumed that the waste liquor contains ammonium sulfite at a pH of about 7.0; in practice the waste liquor may have a somewhat lower pH of about 5.5–6.0, in which event considerable amounts of ammonium bisulfite are present. As a result of this 100 tons per day pulping operation, approximately 1460 tons per day of waste liquor is transferred to waste liquor storage vessel 10. This liquor contains approximately 6.8 weight percent total solids.

Waste liquor from storage vessel 10 is pumped via line 10a to evaporating system 14, where, to minimize corrosion, its pH is adjusted to about 7.0 by introducing alkaline liquors from reaction chamber 18 via line 18d. In evaporating system 14, which may be a conventional single or multiple stage evaporating system, roughly half of the water is removed and correspondingly the total solids content is increased, here to approximately 12.2 weight percent.

The concentrated stream from evaporating system 14 is then pumped via line 14a to mixer 16, where it is combined with recycle furnace ash (consisting almost entirely of magnesium oxide) supplied from filter 26 via line 26b, and with magnesium oxide carrier makeup, the latter supplied at a rate of about 1 ton per day via line 16b. The amount of furnace ash supplied to mixer 16 is an independent variable of the waste liquor treating process, and is controlled so as to provide sufficient inorganic material to give the waste liquor solids bulk and friability to permit effective burning in fluidized bed furnace 22. In this example, 19 tons per day of furnace ashes are cycled via line 26a to mixer 16. The solid-liquid stream leaving mixer 16 through line 16a has a total solids content of 19.2 weight percent, 28.7 percent of which is due to carrier makeup from line 16b and recycle furnace ash from line 26b.

Stream 16a from mixer 16 is pumped to reaction chamber 18, which is an agitator-equipped vessel provided with direct or indirect steam via line 18a. The mixture is advantageously retained in reaction chamber 18 for a period of between about 15 to about 30 minutes at a temperature between about 95 and 105° C. in order to permit complete reaction between the magnesium oxide or hydroxide and the components of the concentrated waste liquor. In the course of this treatment ammonia gas is liberated, and a separable solid-like complex of magnesium hydroxide and organic solids is formed. Ammonia gas and water vapor are continuously withdrawn from reaction chamber 18 via line 18b and suction system 28, which is a water aspirator supplied with processed liquor from filter 26 supplied via lines 26a and 26d.

The major reactions occurring in chamber 18 may be illustrated schematically as follows:

$$Mg(OH)_2 + (NH_4)_2SO_3 \rightarrow MgSO_3[ppt.] + NH_3[gas]$$
$$Mg(OH)_2 + (organic\ materials) \rightarrow$$
$$Mg(OH)_2(organic\ materials)[complex]$$
$$Mg(OH)_2 + NH_4(lignosulfonate) \rightarrow$$
$$Mg(lignosulfonate) + NH_3[gas]$$

Various other reactions take place without being readily susceptible of definition. For example, it is believed that some condensation of lower molecular weight lignosulfonates to higher molecular weight materials may occur, with the result that the lignosulfonate is rendered somewhat less soluble.

Reaction chamber 18 is preferably operated near atmospheric pressure. The use of a pressure vessel for the chamber is not recommended so as to minimize the cost of this equipment and its auxiliaries. For this reason the maximum temperatures (i.e., about the boiling point of the mixture involved) are specified in order to take full advantage of the elevated temperatures at atmospheric pressures. However, in some cases it may be beneficial to use pressure vessels to allow higher temperatures and pressures to give shorter reaction times.

The slurry in reaction chamber 18 is pumped via line 18c to a cyclonic evaporator 19. Then the cooled and concentrated stream drops from the cyclonic evaporator to a retention vessel 21, where it is retained for ten to twenty minutes to allow the precipitation of the carrier organic complex and magnesium lignosulfonates. The slurry is then pumped via line 21a to a solids-liquid separator typified by filter 30. Alternative separators such as centifuges, clarifiers, settling tanks, hydrocyclones, thickeners, or the like may be substituted for filter 30. In filter 30 the solids composed of solid material originally in the waste liquor and magnesium hydroxide is separated from the mother liquor and is conducted via line 30b to furnace 22; this solids stream is approximately 50 percent by weight of total solids and constitutes about half of the original total solids content of the waste liquor from the digesters. The mother liquor from filter 30 is passed via line 30a to liquor storage vessel 23; this stream contains about 8.6 percent total solids.

According to the preferred embodiment of the invention, furnace 22 is a fluidized bed furnace in which oxidation of combustible or partially combustible carbonaceous and sulfur-containing solids, decomposition of magnesium sulfite to MgO and $SO_2$, calcination of $MgCO_3$ and $Mg(OH)_2$ to MgO, and similar oxidative and/or thermal reactions occur in a dense bed of agitated solid particles, maintained in a fluidized state by the introduction of combustion air via line 22b into the bottom of the furnace and by the withdrawal of flue gas from the top via line 22c. In the optimum form of a fluidized bed furnace, solids from line 30b are introduced in the form of a finely divided spray of wet solids into the dilute phase zone near the top of furnace 22 where water is removed by evaporation; the dried solids then descend into the burning zone where combustibles resulting from the pulping process are oxidized and thereby converted to carbon dioxide, water, sulfur dioxide, and similar products of combustion and where the inorganic carrier is reclaimed chiefly as magnesium oxide.

Conditions within the burning zone of furnace 22 are controlled so as to maintain oxidizing conditions for complete combustion of combustibles. Thus, the amount of air admitted via line 22b is regulated to provide a slight excess of oxygen in the vented flue gases leaving furnace 22 via line 22c. The temperature in the combustion zone is ordinarily held between about 1400 and about 2000° C. The dense phase burning zone of furnace 22 is maintained within the range of about 1400 to about 2000° C. to achieve rapid and thorough combustion without sintering of the magnesium oxide, and the residence time is controlled between about 5 and 10 minutes. If necessary, supplementary combustibles may be introduced into furnace 22 in the form of oil, natural gas, or the like to increase the temperature, or cooling of the dense phase may be provided either by direct steam or water introduction or by providing furnace 22 with cooling coils.

To recover waste heat, furnace 22 may be provided with a plurality of boiler tubes extending into the dense phase (optimum practice if it is desired to provide direct temperature control of the bed), the dilute phase, or the flue gas system. These tubes are omitted from the figure for reasons of clarity and simplicity of presentation, but those skilled in the fluid catalyst processing art will perceive the details of boiler tube design and location. Boiler tubes are omitted from the other figures herein, again for the same reason, and it is similarly intended that such tubes be installed for process heat recovery.

Furnace 22 is also equipped with one or more cyclone separators 22d to separate finely divided magnesium oxide from flue gas leaving the furnace. Magnesium oxide furnace ash collected by the cyclone separators 22d is transferred via dipleg 22e to line 22a, where it joins a similar stream of finely divided magnesium oxide furnace ash withdrawn from the dense phase burning zone of furnace 22. The combined streams of magnesium oxide furnace ash, constituting approximately 19 tons per day, are conducted via line 22a to mixer 24.

In mixer 24 the magnesium oxide furnace ash is slurried with mother liquor or filtrate supplied from filter 30 via line 30a and liquor storage vessel 23, so as to produce an alkaline slurry containing about 10.6 percent total solids, most of which is magnesium oxide or hydroxide. This stream may be passed to filter 26 to separate a predominantly liquid mother liquor from a predominantly solid material, the mother liquor passing through line 26a while the solids pass through line 26b for recycle to mixer 16. The liquid portion flowing through line 26a contains about 6.2 weight percent total solids, of which the predominant component is the original solids in the influent to the treating system. Filter 26 recovers about 30 percent of the original solids content of the lignin from the digesters.

This embodiment as shown in FIGURE 1, also permits bypassing mixer 24 and filter 26 so that a portion of the filter mother liquor in liquor storage vessel 23 is conducted via line 23b to the stream of wet solids leaving filter 26 via line 26b. This procedure facilitates handling and recycling of the furnace ashes. By this procedure it is possible to adjust the solids content of material in line 26b so that it will be fluid enough to permit ready passage through pumps and conduits without recycling excessive liquid. At the same time one may avoid overloading mixer 24 and filter 26 with excessive liquids.

As noted previously, the amount of furnace ash cycled via line 26b from filter 26 to mixer 16 is one of the important independent variables of the process of the present invention. Sufficient ash, that is, magnesium oxide, is cycled to provide adequate solids for combustion in furnace 22 as well as to provide sufficient solids to form a separable solid "complex" with the liquid in reaction chamber 18 so that a substantial portion of the organic material in waste liquor storage tank 10 may be separated by filtration in filter 30. It is desirable to maintain a high rate of furnace ash recycle, although it will be appreciated that a high recycle rate tends to lower the temperature in the dense phase or burning zone of furnace 22. Too high a recycle rate may result in too low a furnace 22 temperature for adequate combustion and destruction of the organic material and for calcination of magnesium hydroxide to magnesium oxide.

The mother liquor leaving filter 26 via line 26a is divided, a minor portion of about 90 tons per day passing via line 26d to suction system 28 and a major portion of about 423 tons per day passing into sulfur dioxide absorption tower 25. That portion passing through suction system 28 provides an aspirated vacuum to withdraw ammonia and water vapor from reaction chamber 18 via line 18b, and discharges liquid and aspirated vapors via line 28a to the sulfur dioxide absorption tower 25. The furnace flue gases containing nitrogen, carbon dioxide, sulfur dioxide and small amounts of oxygen are passed from furnace 22 to sulfur dioxide absorption tower 25 via line 22c, where the sulfur dioxide is absorbed by the mother liquor used to recover ammonia from the water aspirator via line 28a. A sufficient amount of sulfur dioxide makeup is added to line 22c to maintain a pH of 4.5 in the stream leaving the sulfur dioxide absorption tower via line 25a. This stream containing ammonium bisulfite is introduced at the top of the fatty acids stripping tower 28e and is stripped relatively free of acetic and formic acids by an ascending stream of sulfur dioxide-free gases obtained from the sulfur dioxide absorption tower 25 via line 25b. If desired, some of the gases from the SO₂ absorption tower 25 may be vented via lines 25c and 28b.

Sulfur dioxide absorption tower 25 advantageously comprises an absorption vessel in which liquid streams are added at or near the top, while gases containing absorbable constituents—chiefly sulfur dioxide—are admitted at or near the bottom. The tower is provided with packing material which distributes the descending liquid and permits intimate gas-liquid contact by the ascending gases. Packing materials may be any of several commerically available types (such as partition rings, spiral tiles, Raschig rings, Berl saddles, wire mesh packings, or the like, or may comprise or consist of perforated plates or plates provided with bubble caps much like those of fractional distillation columns.

A particularly advantageous design of the sulfur dioxide absorption system tower is the turbulent contact absorber described, for example in "Pulp and Paper," June 15, 1964, pages 24–25. This absorber utilizes a bed of freely movable inert spherical solids, best made of polypropylene which has a specific gravity slightly less than that of water. Thus, ascending gases and descending liquids agitate the polypropylene balls and permit gas-liquid contact at high gas and liquid throughputs.

Sulfur dioxide absorption tower 25, as indicated schematically in FIGURE 1, receives liquid streams via lines 28a and 26d near an upper portion thereof, and receives flue gases from furnace 22 via line 22c near its bottom portion. The flue gases contain recoverable sulfur dioxide as well as other products of combustion and as they pass upwards through absorption system 25 are stripped of sulfur dioxide by absorption in the descending liquid. Lean gases exit from absorption system 25 via vent line 25a and are discharged to the atmosphere.

If desired, ammonia makeup for the sulfite cooking liquor may be added to sulfur dioxide absorption system via line 20c leading to sulfiting tower 20. This ammonia makeup accommodates that lost in the pulping operation, particularly at the pulp washers, as well as the small amount lost in this process. The small amount lost in this recovery process is a notable advantage of the present invention, in that most of the ammonia is recovered and recycled to the pulp cooking operation.

Liquid leaving fatty acid stripping tower 28e is conducted via line 28d to sulfiting tower 20, where additional sulfur dioxide makeup and the entire ammonia makeup are added via lines 20b and 20c respectively. Sulfiting tower 20 may be of the same design as the towers discussed above in connection with sulfur dioxide absorption tower 25. In sulfiting tower 20 sufficient sulfur dioxide and ammonia are added to make up the final pulping liquor, which is released from the bottom of sulfiting tower 20 via line 20a at a rate of about 540 tons per day. This liquor contains 5.8 weight percent total solids, and is suitable for use in ammonium base sulfite pulping operations.

pH control of the pulping liquid is maintained by regulating the relative amounts of sulfur dioxide and ammonia makeup to sulfiting tower 20. Thus, for the operation of this example, the proportion of $SO_2$ to $NH_3$ is regulated so as to provide a pH in the range of about 6.5–8.0 for the digesters.

Example 2

This example illustrates the process of the invention as applied to the treatment of magnesium base sulfite waste liquor.

The pulping process of this example is, for illustrative purposes, a medium acid pulping process in the pH range of from about 4.0 to 6.5, in which it is assumed that the pulp mill produces 100 tons of pulp per day, and employs a wood to liquor ratio of 1:3.5 and a dilution ratio at the washers of 1:2.5 (weight ratio). Also, cooking conditions are such as to give a pulp yield of fifty percent by using a pulping chemical charge of twenty percent (percentages based on moisture-free wood). That is, this example represents a full chemical cook by use of a basically bisulfite liquor.

Figure 2:
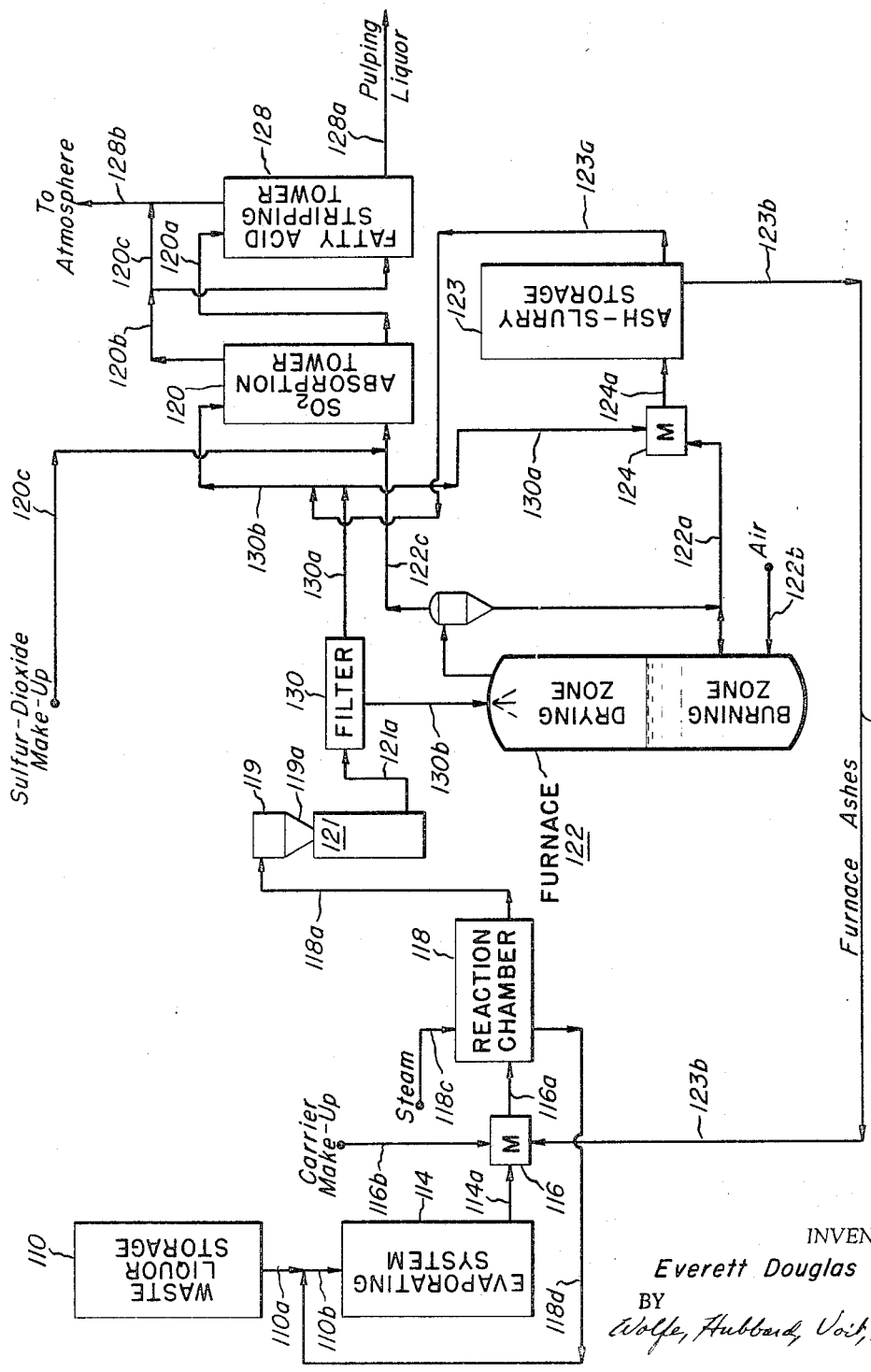
FIG. 2 is a waste liquor treating process for use with a magnesium base sulfite pulping operation.

Referring to FIGURE 2, the waste liquor from a magnesium base sulfite pulping operation is passed to a waste liquor storage vessel 110. With a pulp mill producing 100 tons per day of pulp, and with the variables as described above, 1750 tons per day of waste liquor needs to be treated. This contains about 8.0 weight percent total solids.

Waste liquor is transferred from storage vessel 110 via line 110a to evaporating system 114. En route, the pH is adjusted to about 7.0 by introduction of a portion of the alkaline liquid in reaction chamber 118, which is fed to line 110a via line 118d. Evaporating system 114 is operated so that the original 8.0 weight percent total solids is increased to about 14.4 weight percent total solids by removal of somewhat more than half of the water.

The concentrated liquor from evaporating system 114 is conducted via line 114a to mixer 116, where it is mixed with about 6 tons per day of makeup magnesium oxide cooking base and carrier, and about 17.6 tons per day of recycle furnace ash (magnesium oxide) from furnace 122 via line 123b. As discussed in connection with FIGURE 1, recycle of furnace ash is an important independent variable of the process, and is added in an amount sufficient to provide a friable solid for combustion in a fluidized bed furnace and to produce a separable solid complex-like mass for separation in filter 130. The slurry of furnace ashes, makeup magnesia (magnesium oxide) and concentrated waste liquor is transferred from mixer 116 via line 116a to reaction chamber 118, where either open or indirect steam is added via line 118c to raise the temperature to about 95–105° C. The mixture is retained at this temperature for from about 10 to about 20 minutes, advantageously with agitation, to permit the formation of a separable solid complex between dissolved solids originally in the waste liquor stream and magnesium hydroxide.

Reactions occurring in the reaction chamber, and to a limited extent in lines 110a and 110b, are mainly those indicated below:

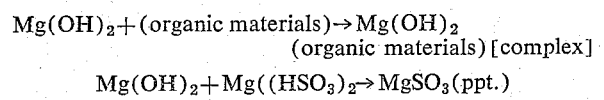

$$Mg(OH)_2 + Mg((HSO_3)_2 \rightarrow MgSO_3(ppt.)$$

The reacted mixture in reaction chamber 118 is pumped via line 118a to the cyclonic evaporator 119 from which it is passed to retention chamber 121 via line 119a. After being retained in chamber 121 for some ten to twenty minutes to promote the separation of the magnesia organic matter complex, and magnesium lignosulfonates this mixture is transferred to filter 130 via line 121a. This filter or equivalent equipment separates a mother liquor containing about 4.8 percent total solids from a wet 50 percent-solids mixture for combustion. This 50 percent-solids mixture contains about half of the original solids content of the process liquid from the digesters. The mother liquor is sent via line 130a to mixer 124 where it is combined with furnace ash obtained from furnace 122; the wet solids from filter 130 are transferred via line 130b to the top or drying zone of furnace 122 where they are first dried in the dilute phase or upper drying zone of the furnace, and then descend to the dense phase or burning zone of the furnace for calcination of magnesium hydroxide to the oxide and for combustion of the organic content. Furnace 122 may take the form of furnace 22 shown in FIGURE 1, but for simplicity it is here depicted schematically.

Combustion air is admitted into the bottom of furnace 122 via line 122b and flue gases exit from the furnace via line 122c. Flue gases are conducted to the bottom of sulfur dioxide absorption system 120 for recovery of sulfur dioxide therefrom; other combustion products such as nitrogen, carbon dioxide, water, etc., are likewise present in the stream entering absorption system 120 from furnace 122.

As previously noted, mother liquor from filter 130 is combined in mixer 124 with furnace ash from furnace 122, which leaves the furnace via line 122a. As a result the slurry is about 7.2 weight percent total solids and may be conducted via line 124a to slurry storage vessel 123.

About two thirds of the slurry transferred to slurry storage vessel 123 is cycled via line 123b to mixer 116 to provide recycled magnesium hydroxide for reaction in chamber 118 and subsequent combustion in furnace 122 as previously described, while the other one third is conducted via line 123a to the top of the sulfur dioxide absorption tower 120. The sulfur dioxide makeup to replace the sulfur dioxide lost in the pulping operation as well as that small amount lost in this process is added via line 120c to the furnace flue gases in line 122c so that it is introduced near the bottom of the sulfur dioxide absorption tower 120. This tower 120 may be of the same form as the sulfur dioxide tower 25 or sulfiting tower 20 of FIGURE 1, in each case having a liquid or solid-liquid slurry entering near the top of the absorption tower and the sulfur dioxide containing gases entering near the bottom of the tower. The sulfur dioxide lean gases exit from the sulfur dioxide absorption tower 120 via line 120b, which transfers part or all of these exit gases to the bottom of fatty acid stripping tower 128. If all these gases are not required for use in this latter tower 128 part may be passed to vent line 128b via 120c. The liquor stream is transferred from the bottom of the sulfur dioxide absorption tower 120 to the top of the fatty acids stripping tower 128 via line 120a. The fatty acid containing gases are vented from the fatty acid stripping tower 128 to the atmosphere via line 128b, while the prepared pulping liquor exits via line 128a at the bottom of the fatty acids stripping tower. The addition of makeup sulfur dioxide is controlled to adjust the final pH of the pulping liquor within the range of 4.0 to 5.0. It will be apparent that with the system of FIGURE 2 that the amount of sulfur dioxide losses in this treatment process is quite small inasmuch as streams containing dissolved sulfur dioxide or sulfur dioxide gas are recycled or treated for recovery.

In the system described in FIGURE 2, 650 tons per day of pulping liquor is recovered via line 120a. This liquor contains 7.9 percent total solids and is immediately suitable for use as a medium acid magnesium base sulfite pulping liquor.

*Example 3*

Figure 3:
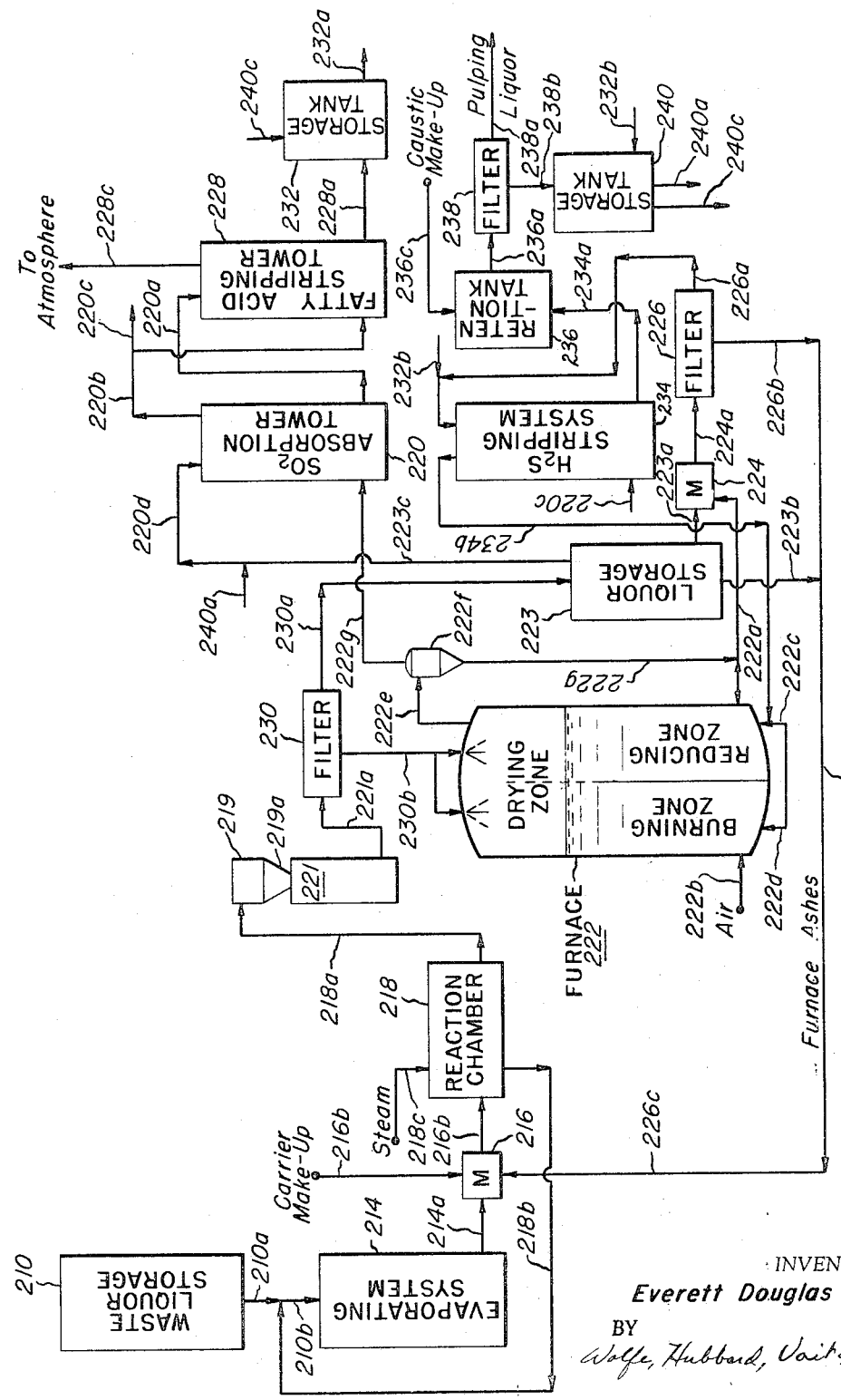
FIG. 3 is a waste liquor treating process for use with a sodium base sulfite pulping operation.

This example, taken in conjunction with FIGURE 3, illustrates an embodiment of the invention suitable for treating waste liquor from a sodium base sulfite pulping operation. For illustrative purposes, it is assumed that sulfite pulping is conducted with a 20 percent pulping chemical charge (based on moisture-free weight of wood) under alkaline conditions, i.e., in the pH range of 8.0 to 10.0 with a wood:liquor ratio of 1:3.5 (by weight). Also, that a dilution of 1:2.5 (by weight) is used at the pulp washers and a 70 percent pulp yield is achieved in this pulping operation. It is further assumed that the capacity of the pulp mill is 100 tons per day.

Waste liquor from the pulping operation is received in waste liquor storage vessel 210 at the rate of 1255 tons per day. It contains 5.7 weight percent total solids and is at an alkaline pH.

From storage vessel 210 it is pumped via line 210a to evaporating system 214, where nearly two-thirds of the water is removed to provide a total solids content of about 12.7 percent. The concentrated waste liquor from evaporating system 214 is pumped via line 214a to mixer 216.

Mixer 216 combines the concentrated waste liquor with about 0.3 ton per day of makeup magnesium oxide carrier, introduced via line 226b, and with about 160 tons per day of slurry containing about 28 tons per day of total solids, 5 tons of which is recycle furnace ash and the remainder solids separated from the incoming waste liquor. The solids are obtained from filter 226 via line 226b and 226c and from storage vessel 223 via line 223b. As with the operations previously described in connection with Examples 1 and 2, recycle furnace ash is introduced in amounts sufficient to provide a separable solid entering filter 230 and to afford a sufficiently high inorganic content for fluidized bed combustion of the solids entering furnace 222.

The resultant slurry produced in mixer 216 is transferred via line 216b to a steam heated reaction chamber 218, where direct or indirect steam maintains a temperature of about 95 to about 105° C. for about 10 to about 20 minutes. During this time the magnesium oxide or hydroxide forms a separable solid complex-like material with the organic materials originally in the waste liquor.

The slurry from reaction chamber 218 is pumped via line 218a to cyclonic evaporator 219, chest 219a, tank 221, and line 221a to filter 230, where a 50 percent total solids stream representing about half of the total solids in the original waste liquor is withdrawn via line 230b while a mother liquor stream, containing about 10.7 percent total solids (dissolved) is discharged via line 230a to liquor storage tank 223. As schematically shown in FIGURE 3, furnace 222 is divided into three zones; an upper or dilute phase drying zone, a first lower dense phase burning zone, and a second lower dense phase reducing zone. A vertical partition divides the burning zone from the reducing zone, and is perforated near the upper portion thereof to permit fluidized solids to pass from the former to the latter. Combustion air is admitted via line 222b, while reducing gas having a stoichiometric deficiency of oxygen and containing carbon monoxide, hydrogen, or a hydrocarbon is admitted to the reducing zone via line 222c. Flue gases are discharged from furnace 222 via vent line 222e, which leads to cyclone 222f. Fluidized solids entrained in the flue gases are separated by cyclone 222f and are returned to the burning zone of furnace 222 via line 222g, while solids-free stack gases are discharged from cyclone 222f via line 222c leading to sulfur dioxide absorption tower 220.

Wet solids from filter 230 are injected into furnace 222 via line 230b, and may be introduced above the burning zone or above the reducing zone, or both. If introduced above the reducing zone the carbonaceous content of the solids assists in maintaining a reducing atmosphere in the reducing zone, thereby minimizing the amount of reducing gas introduced via line 222c necessary to maintain reducing conditions in the reducing zone.

Combustion of organic materials is effected in fluidized bed furnace 222 in order to convert these materials to carbon dioxide, sulfur dioxide, and water, and to calcine the magnesium hydroxide carrier to magnesium oxide. Somewhat stringent control over conditions in fluid bed furnace 222 so as not to vaporize the sodium compounds present. Sufficient carrier, i.e., magnesia, etc., must be present to provide adequate bulk and friability to the medium, and in order to prevent the formation of a viscous mass at the prevailing temperatures and a glass-like clinker when the temperatures are lowered. (Since most of the sodium compounds present melt in the 800 to 1000° C. range, these compounds will be in a molten state in the furnace. These sodium compounds vaporize at a relatively low temperature, i.e., between 1100–1400° C.) Thus, the temperature existing in the burning zone of furnace 222 should be within the range of about 1100° C. to about 1400° C., and advantageously should not exceed 1300° C. Similarly, the temperature of the reducing zone should likewise be within the foregoing range.

Under optimum practice of the invention, a hydrogen sulfide-containing gas stream obtained from hydrogen sulfide stripping system 234 is introduced into furnace via line 234b, advantageously into the burning zone. Thus hydrogen sulfide is oxidized in furnace 222 to sulfur dioxide, which may be collected and recycled to the pulping operation without the need for hitherto expensive facilities for burning the hydrogen sulfide so as to avoid atmospheric pollution. Alternatively the hydrogen sulfide containing stream of line 234b may be introduced into the reducing zone of furnace 222 in order to assist in maintaining a reducing atmosphere therein.

The main reaction believed to exist in the reducing zone of furnace 222 in addition to calcination of some carrier is:

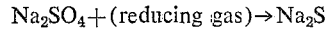
$$Na_2SO_4 + (\text{reducing gas}) \rightarrow Na_2S$$

The other major sodium compound, sodium carbonate, is little affected, if at all, in the reducing zone.

Reduced solids from the reducing zone of furnace 222 are transferred via line 222a at a rate of about 11 tons per day to mixer 224. These solids are composed of about 5.7 tons of magnesia (MgO) and about 5.3 tons of sodium compounds, mainly sodium sulfide. Meanwhile, mother liquor obtained from filter 230 via line 230a and stored in storage tank 223 is distributed through three lines. One of the two main portions about 190 tons per day, is transferred to mixer 224 via 223a where it combines with the solids (furnace ashes) from line 222a. The resulting slurry is passed via line 224a to filter 226, where a 50 percent total solids stream is withdrawn via line 226b at the rate of about 18 tons per day while the mother liquor containing the sodium compounds of the furnace ashes is conducted via line 226a to the hydrogen sulfide stripping system 234. The other main portion of the mother liquor from storage tank 223, also about 190 tons per day, is conducted via line 223c to the sulfur dioxide absorption system 220. Additionally, the minor or third portion of the liquor stored in storage tank 223 is conducted via line 223b at the rate of 124 tons per day to line 226b, where it mixes with the 50 percent solids stream from filter 226. This combined slurry stream containing 17.7 percent total solids is transmitted via line 226c to mixer 216, where it provides recycled carrier solids for the complex formation and fluidized bed burning operations.

Sulfur dioxide from vent line 222e of furnace 222 is recovered, and sodium base sulfite cooking liquor is prepared, by reacting a magnesium bisulfite-magnesium sulfite mixture with the sodium sulfide solution of line 226a. This is accomplished by first preparing the magnesium bisulfite-magnesium sulfite slurry in the sulfur dioxide absorption system 220 by combining sulfur dioxide from line 222c and a magnesium hydroxide-magnesium sulfite slurry from line 220d. This prepared magnesium bisulfite-magnesium sulfite slurry is mixed in hydrogen sulfite stripping system 234 with the sodium sulfide solution of line 226a (obtained from filter 226), and the generated hydrogen sulfide gas quickly flushing out the H$_2$S by stripping with a sulfur dioxide-free furnace flue gas. This reaction may be represented by the following equation:

$$Mg(HSO_3)_2 + Na_2S \rightarrow Na_2SO_3 + MgSO_3[ppt.] + H_2S[gas]$$

By this reaction the formation of inert thiosulfate is avoided or minimized. It is believed that the inert thiosulfate is formed by reaction between sodium sulfite and free sulfur, which in turn is formed from the reaction between sulfur dioxide and hydrogen sulfide. In order to avoid the formation of sulfur dioxide from the side reaction between the sulfites and the hydrogen ion present, the pH of this reaction mixture is carefully controlled by using a mixture of magnesium bisulfite and magnesium sulfite at pH's in the range of about 5.5 to 6.5. (The magnesium sulfite in this mixture is not involved in the reaction.)

For this reason it is necessary both to remove the hydrogen sulfide as quickly as possible and to control the pH of the mixture to minimize the formation of sulfur dioxide. By this means reaction between these two gases can be avoided and the formation of thiosulfate can be reduced to a minimum. This is particularly important inasmuch as appreciable amounts of thiosulfate cannot be tolerated in sulfite pulping liquors where it causes the decomposition of the sulfite ion during cooking of the wood or other cellulosic materials.

To this end, the furnace off-gases of line 222g are combined with sulfur dioxide makeup, not shown, and the resultant stream is fed to the bottom of a sulfur dioxide absorption tower or system 220, similar in construction and operation to sulfur dioxide absorption system 25 of FIGURE 1. Here the sulfur dioxide gas is absorbed by a stream of magnesium hydroxide and magnesium sulfite slurry prepared by mixing a stock slurry of these materials obtained from storage tank 240 via line 240a and the mother liquor via line 223c. This prepared slurry is introduced to the top of sulfur dioxide absorption tower 220 via line 220d. Sulfur dioxide is absorbed by this alkaline stream and the unabsorbed gases, namely, nitrogen, carbon dioxide, etc., from the furnace flue gases are discharged via vent line 220b, either to the fatty acids stripping tower 228 or to the hydrogen sulfide stripping system 234 via line 220c. According to the preferred embodiment, all or part of the off-gases from sulfur dioxide absorption system 220 are passed to hydrogen sulfide stripping system 234, to be described presently.

The magnesium bisulfite solution produced in the sulfur dioxide absorption system 220 is maintained at a pH around 4.5 by controlling the introduction of the magnesium hydroxide-magnesium sulfite slurry to this system. This prepared slurry is conducted to the top of the fatty acids stripping tower 228, while some of the exit gases from the sulfur dioxide absorption tower 220 are introduced at the bottom of the fatty acids stripping tower 228, which is constructed and operated similarly to the sulfur dioxide absorption system 25 of FIGURE 1. The fatty acid enriched gases are discharged via line 228c from the top of the fatty acids stripping tower 228 to the atmosphere or to a fatty acid recovery system.

The magnesium bisulfite solution or slurry is transferred from fatty acid stripping tower 228 to storage tank 232 during which the pH may be adjusted to pH 5.5–6.5 by using some of the magnesium hydroxide-magnesium sulfite slurry obtained via line 240c. This solution or slurry is conducted via lines 232a to line 238b to dilute the 50 percent solids from filter 238, and via lines 232a and 232b to line 226a where it is mixed with the sodium sulfide containing liquor. This latter mixture is quickly introduced into the hydrogen sulfide stripping system, which operates similarly to the sulfur dioxide absorption system 25 in FIGURE 1. Some of the vent gases from sulfur dioxide absorption tower 220 are introduced via lines 220b and 220c at the bottom of the hydrogen sulfide stripping system 234 to effect the removal of hydrogen sulfide generated in this system according to the reaction mentioned above. The hydrogen sulfide enriched gases are discharged from this system 234 via line 234b and conducted to the burning zone or the reducing zone of the furnace 222.

To recapitulate, a particular objective achieved by the system shown in FIGURE 3 is to avoid undesirable side reaction when magnesium bisulfite solution is reacted with sodium sulfide present in the mother liquor obtained from filter 226 via line 226a. The reaction produces hydrogen sulfide gas, which reacts with sulfur dioxide to produce free sulfur; this in turn reacts with sodium sulfite to form sodium thiosulfate, an undesirable constituent of sulfite cooking liquors. This objective is obtained by mixing the sodium-sulfide containing stream of line 226a and the magnesium bisulfite-magnesium sulfite containing stream of line 232b while rapidly stripping out hydrogen sulfide formed by use of a stream of gas obtained from sulfur dioxide absorption system 220 via line 220c. Thus, before the hydrogen sulfide has had an opportunity to react with sulfur dioxide to form free sulfur, and then thiosulfate, it is removed from the system by physically stripping with a non-reactive gas.

Hydrogen sulfide stripping system 234 may comprise a tower of the type used for sulfur dioxide absorption system 25 of FIGURE 1, but with comparatively little packing material or relatively few plates or trays so as to minimize the amount of liquor holdup in the system. Liquid fed to stripping system 234 may initially be at a temperature within the range of about 100 to about 130° C. so as to facilitate rapid hydrogen sulfide stripping without excessive removal of sulfur dioxide.

As before noted, the hydrogen sulfide, containing off-gases from stripping system 234 are conducted via line 234b to furnace 222 for combustion to sulfur dioxide or for use in providing a reducing atmosphere for the furnace.

The liquid leaving hydrogen sulfide stripping system 234 is a slurry containing relatively insoluble magnesium monosulfite, produced by reaction of magnesium bisulfite with sodium sulfide solution, and is withdrawn via line 234a. The pH of this effluent stream is adjusted by admitting caustic soda via line 236c into effluent line 234a or into the retention tank 236 so as to maintain the pH above about 8.0 and thus ensure insolubility of the magnesium hydroxide and monosulfite. The following reaction is the principal one occurring:

$$MgSO_3 + NaOH \rightarrow Na_2SO_3 + Mg(OH)_2[ppt.]$$

Because this reaction occurs rather slowly, a retention vessel or tank 236 is provided. The resultant admixture in effluent line 234a is conducted to the retention tank 236, from whence it is pumped via line 236a to filter 238. Filter 238 removes a wet solid stream 238b containing the magnesium hydroxide and monosulfite for recycle to storage tank 240 and then to sulfur dioxide absorption system 220 via line 240a, and produces a sodium sulfite containing pulping liquor at line 238a which is suitable for returning to the pulping operation.

It will be apparent from the foregoing description that a particularly advantageous method has been developed for recovering and processing sodium base sulfite waste liquor. Heretofore the industry has been particularly troublesome inasmuch as sodium compounds tend to melt at temperatures necessary for oxidation of carbonaceous wastes. Alternative proposals involving chemical treatment of the waste liquor have not met with widespread acceptance for the reason of high and unrecoverable chemical costs. The method of the invention however avoids these difficulties by providing an inert carrier material, namely magnesium oxide, and by conducting the oxidation at comparatively low oxidation temperatures. Furthermore, substantially all of the chemicals employed in the process are recycled, either within the waste liquor treatment process or directly to the pulping operation.

*Example 4*

This example, taken in conjunction with FIGURE 4, illustrates the system of the invention as applied to an alkaline pulping liquor of the kraft type, from which the active pulping chemicals are sulfides or hydroxides or combinations of the two, rather than sulfites and bisulfites.

Again, in this example, it is assumed that the pulp mill produces 100 tons per day of paper pulp, employs a wood to liquor ratio of 1:3.5 and a dilution at the washers of 1:2.5 (weight ratios). Also, that the cooking conditions in respect to temperature and time are such as to give a pulp yield of 50 percent by using a chemical charge of 20 percent (percentages based on moisture-free wood). The original cooking liquor has a pH within the range of 10.0 to 12.0.

Under the foregoing conditions this kraft pulp mill discharges about 1890 tons per day of waste liquor containing about 7.4 weight percent total solids. This liquor is accumulated in waste liquor storage vessel 310, from which it is pumped to absorption tower 312 via line 310a.

The purpose of absorption tower 312 is to reduce the pH to a range of about 7.5 to 9.0, which is accomplished by treating the waste liquor with at least a portion of the acidic flue gases from furnace 322. These gases are carbon dioxide and sulfur dioxide produced by the combustion of carbonaceous and sulfur-containing materials in the furnace 322. These gases are introduced via line 322c at the bottom of absorption tower 312 and the waste liquor is introduced via line 310a at the top of this tower so that acidic gases are absorbed by the down-flowing liquor in the tower. The acidified liquor leaves the bottom of the tower 312 via line 312a, through which it is transferred to the evaporating system 314. The off-gases from the absorption tower 312 (which may be of the type and construction of the sulfur dioxide absorption system 25 in FIGURE 1) are discharged to the atmosphere via line 312b.

Approximately three quarters of the water is removed from the waste liquor in the evaporating system 314 to give a total solids content of about 22.8 weight percent. This concentrated material is then pumped via line 314a to mixer 316, to which is added 6 tons of magnesia carrier per day (.03 ton per day of magnesia makeup and 5.7 tons of magnesia per day as recycled furnace ashes via line 326c). The small amounts of sodium salts, mainly as sodium sulfide, in the furnace ashes is not objectionable in this case.

This mixture is transferred via line 316a to reaction chamber 318, where direct and indirect steam, supplied via line 318b, maintains a slurry mixture at a temperature within the range of about 95 to 105° C. for from 5 to 10 minutes. This enables a "complex" of magnesium hydroxide and solids originally in the waste liquor to form as a separable solid mass.

The reacted mixture from reaction chamber 318 is pumped via line 318a to cyclonic evaporator 319, chest 319a, tank 321, and line 321a to filter 330 for separation of the complex from the remaining mother liquor. The complex, composed of about 50 weight percent total solids, the balance being adherent liquid, is conducted via line 330b to the drying zone of furnace 322, which advantageously may take the form of the three-section fluidized bed furnace shown in FIGURE 3. Under the above prescribed conditions about one half of the total solids in the original waste liquor from storage vessel 310 is separated from the mother liquor at filter 330. Meanwhile, the mother liquor from filter 330 containing about 13.3 weight percent total solids (dissolved) is conducted at the rate of about 456 tons per day via line 330a to liquor storage vessel 323.

In furnace 322 the wet solids from line 330b are introduced to a dilute phase drying zone where water is removed by the hot furnace gases. The solids are then transferred to a burning zone where, under oxidizing conditions, that is, with an excess of oxygen-containing gas above that necessary to oxidize carbonaceous materials to carbon dioxide and convert sulfides to sulfates, the solids are oxidized at a temperature within the range of about 1100° to about 1400° C. The solids then pass to the reducing zone of furnace 322 where, in the presence of a reducing gas, that is, one having an excess of oxidizable components such as hydrogen, hydrogen sulfide, carbon monoxide, or the like, most of the sodium sulfate is reduced to sodium sulfide. There will however be a substantial proportion of sodium carbonate present which is essentially resistant to reduction, and this is treated downstream in the manner to be described presently.

As discussed in connection with FIGURE 3, an oxidizing stream of air is admitted via line 322b, to the oxidizing or burning zone of the furnace 322, while a reducing gas is admitted via a conduit 322d to the reducing zone of the furnace.

Reduced solids from furnace 322, consisting almost entirely of inorganic ashes, are conducted via line 322a at the rate of about 6 tons per day to mixer 324, where they are combined with a major amount of mother liquor obtained from filter 330 via line 330a and liquor storage vessel 323; typically this amount is 417 tons per day, and is pumped from vessel 323 to mixer 324 via line 323a. A minor amount of this liquor is pumped via line 323b at a typical rate of 109 tons per day to the solids-enriched stream leaving filter 326 via line 326b so as to provide a pumpable slurry to recycle the furnace ashes via line 326c.

Additionally, a stream of lime washer effluent, of a composition to be described, is transferred to mixer 324 via line 328c at a rate of about 325 tons per day. The combined streams entering mixer 324 are agitated and then pumped via line 324a to filter 326 for separation of solids, chiefly furnace ashes, from mother liquor. Ordinarily an additional 30 percent or so of the total solids content of the waste liquor in vessel 310 is recovered at filter 326. The solids are transferred via line 326b along with mother liquor from line 323b as recycle to mixer 316 and thence to the furace 322 while the mother liquor from filter 326 is transferred via line 326a to a causticizing plant 320.

In causticizing plant 320 the sodium carbonate present in the stream entering via line 326a is reacted with an aqueous calcium hydroxide solution to convert the sodium carbonate to sodium hydroxide and to form a calcium carbonate precipitate.

Causticizing plant 320 also includes a filter, not shown, to separate the calcium carbonate solids from the mother liquor. The effluent from this filter is transmitted via line 320a at a rate of about 650 tons per day, and constitutes recycle pulping liquor to the kraft pulping process. This liquor contains about 7.4 weight percent total solids dissolved therein, most of which is sodium hydroxide and sodium sulfide components of the cooking liquor.

After filtration, the calcium carbonate precipitate is washed on a vacuum line washer, not shown, with water supplied from line 320b, and the lime washer effluent, containing some dissolved sodium hydroxide, is the stream supplied to mixer 324 via line 328c.

An alternative procedure is shown in FIGURE 4a. This procedure involves the use of a flocculating chamber 317 and settling basin 318 which may be used in place of the reaction chamber. The evaporating system 314 is arranged in a different order from that normally indicated in the other figures, in that the mother liquor from filter 330 is evaporated to the required volume. The reason for this rearrangement is to permit the use of the maximum volume and the minimum concentration of liquor in the flocculating chamber and the settling basin so as to facilitate the functioning of the flocculating chamber and settling basin. This will not overload the filter 330 because only the sludge from the settling basin is filtered and the clarified liquor bypasses this filter and joins line 330a. In order to facilitate the flocculation of the solids in the waste liquor, part of the recycled furnace ashes, mainly magnesia, is sulfited in absorption tower 312 to yield a magnesium bisulfite solution which is added to the stream at mixer 316 via 312a. The carrier makeup is also sulfited for simplification purposes. In other respects the figure is self-explanatory.

*Example 5*

This example describes an alternative method of treating the waste liquor from an ammonium base sulfite pulping operation.

The recovery of the ammonium base cooking chemical is somewhat different from the recovery of the other common soluble bases such as sodium and magnesium because this base is evolved as ammonia gas. In dealing with the recovery of the residual cooking chemicals from an ammonia base waste sulfite liquor, one replaces the ammonia in the waste liquor with a sodium or magnesium base and carries on with the essential steps of the separation process using the substituted sodium or magnesium organic compounds. The ammonia is evolved from the liquor after the displacement and collected as a gas for recirculation.

In FIGURE 5, the numeral 510 refers to a waste liquor storage tank adapted to receive the waste liquor from a pulping operation. This liquor normally has a 5 to 12 percent total solid content.

The liquor is fed from the storage tank 510 to an evaporator 514 of conventional design where the total solid content is increased to about 20 to 24 percent total solid content.

From the evaporator 514, the cooking liquor is fed to a mixer where a carrier and reactant are added. The carrier is an infusible material or materials which with the cooking chemicals will form an output waste that has sufficient bulk, friability and inorganic solid content for burning in a fluidized bed-type furnace 522 to be discussed more fully later. The purpose of the reactant is to increase the pH of the liquors. In the case of the ammonium base system, the reactant is a compound having a metallic ion that will displace the ammonium ions to form ammonium hydroxide and an alkaline medium containing sulfur compounds so that the ammonia can be evolved by the application of heat in a reaction chamber 518.

In the case of the ammonium base sulfite liquor, both the carrier and the reactant are magnesia. Sufficient magnesia is added to give the mixture sufficient bulk, friability and inorganic solid content for burning in the fluidized bed-type furnace as indicated above and this amount is what is herein defined as the carrier. An additional amount of the same material, that is magnesia, is added to raise the pH of the liquor so that the magnesium displaces the ammonium to form ammonium hydroxide. This reaction takes place in the reaction chamber 518 to which heat is applied to evolve ammonia gas from the ammonium hydroxide produced and leaves magnesium lignosulphonate.

The excess magnesium hydroxide to that required to adjust pH and replace the ammonium ions reacts physically by way of adsorption, coprecipitation and possibly other physical phenomenon with the organic materials and augments or forms part of the carrier noted above for these organic materials which essentially consist of lignosulphonates, simple sugars, simple polysaccharides, and simple organic (fatty) acids, etc.

The purpose of the carrier is to give the output waste bulk and friability and a solid content of which some 50 to 80 percent is inorganic so that it can be burned in a fluidized bed-type furnace. This is the basic difference between this invention and previous methods of a similar nature wherein the solid content of the materials fed to the furnace do not have as high a percentage of inorganic materials with the result that a satisfactory combustion in a conventional type of fluidized bed cannot be readily achieved.

The reaction chamber will not normally be a pressure vessel but is designed according to known principles to obtain the above noted reactions and drive off the ammonia.

The ammonia is conducted from the reaction chamber 518 by conventional means to a conventional sulfiting tower 520 to be referred to later.

The content of the reaction chamber following the reaction above described is conducted essentially in the form of a carrier including magnesium hydroxide, magnesium sulfites and lignosulphonates and other organic materials to furnace 522. The furnace has a pre-drying section to increase the total solid content of the materials sufficiently to where they will burn freely in a fluidized bed. In the furnace, the materials are burned to oxidize the organic materials whereby to leave the infusible materials which consist essentially of the residual cooking chemicals as an ash in the form of the oxide of magnesium, that is magnesia. This is essentially the carrier noted above and it is recirculated from the furnace ash back to the mixer 516. 516.

The sulfites of magnesium fed to the furnace will decompose in the burning action to yield gaseous $SO_2$ which is collected and conducted to the sulfiting tower 520 where it is recombined with the ammonia from the reaction chamber 518 and from a makeup source to give ammonium bisulfite and ammonium sulfite, the cooking chemical in a known manner. The output from the sulfiting tower is conducted back to the cooking operation in the pulping process as regenerated cooking acid.

While the greater percentage of the carrier composition is preferably magnesia, additions to give flow characteristics of the ash through the furnace are desirable. To inhibit the formation of a slag in the furnace, other metallic oxides, such as titanium dioxide, calcium oxide and aluminum oxide can be added.

In addition to the materials added to magnesia to prevent the formation of slag, additives can be added to the carrier to increase its tendency to physically react with the organic content of the waste liquors to form the separable complex where it may be desired to remove water from the liquor prior to burning by filtering as distinct from vaporizing. Additives, such as starch, glues and gelatines, dried ground waste liquor residues and alkali silicates are examples of satisfactory materials. These are organic in nature except for the silicates and will burn off in the furnace.

As an alternative to magnesia as a reactant for the ammonia base process, sodium hydroxide can be used. The sodium ion like the magnesium ion will replace the ammonium ion whereby the ammonia gas can be evolved in the reaction chamber. The use of sodium hydroxide, however, will not result in a compound that will function as a carrier and all of the carrier involved will have to be supplied from other sources.

The removal of the water can, in accordance with the invention, be done in various ways, evaporation is known and possible. Filtering is also a possibility.

Combustion conditions in the furnace are not too sensitive to the composition of the furnace input and it is possible to add wastes from other phases of the pulping and paper-making operation to the input of the furnace for destruction. The sludge from the clarification of white waters, for example, and the effluents from the pulp treatment stages, for example, can be added to the furnace input for burning in the furnace.

The numeral 530 refers to a filter or mechanical separator which might optionally be used with the apparatus illustrated in FIGURE 5. If the filter is used, the output from the reaction chamber would be fed to the filter instead of directly to the furnace. The filter would filter out the carrier and the organic, which together form a separable complex. From the filter these materials would be fed to the furnace and burned as before. The water taken from the output of the reaction chamber by the filter 530 would be conducted to the sulfiting tower. The addition of the filter is specially useful where the conservation of water is important. The water, filtered from the reaction chamber output by the filter 530, in the case of direct furnace feed is evaporated and lost to the process.

*Example 6*

This example describes an alternative system for treating the waste liquor from a magnesium base sulfite pulping operation.

In FIGURE 6, a flow sheet in which the active cooking chemical is magnesium bisulfite is illustrated. It is somewhat more involved than the case of ammonium bisulfite because the magnesium cannot be taken off at the reaction chamber as a gas and the ash output from the furnace which contains both the cooking chemical constituents as well as the carrier must be treated to recover the magnesium prior to recirculation of the carrier.

In this case, the waste liquors are fed from the waste liquor storage tank 610 as before. From the waste liquor storage tank, they are again fed through an evaporator 614 to a mixer 616 where they are united with a carrier which is essentially the same as in the case of the ammonium base sulfite, that is, magnesia which, upon mixing with the water, becomes magnesium hydroxide.

From the mixer 616, the materials are fed to the reaction chamber 618. In the reaction chamber, they are heated to form the organic complex consisting essentially of the lignosulphonate simple sugars, polysaccharides and organic (fatty) acids.

From the reaction chamber, the materials are conducted to the furnace 622 where they are dried and burned. The organic materials are burnt off and the sulfur dioxide evolved is conducted to the sulfiting tower 620 to leave an ash that contains the carrier and the oxides of magnesium, that is, magnesia. This ash output is slurried with water in the mixer 624 and conducted to a sulfiting tower 620. In the sulfiting tower, the cooking chemical magnesium bisulfite is formed in a known manner which together with the carrier, in slurry form, is fed to a filter 626 which separates the carrier from the magnesium bisulfite. The magnesium bisulfite solution is fed back to the pulp forming process and the carrier as magnesium sulfite is fed back to the mixer 616.

As before, sufficient carrier is added to physically combine with the organic materials of the waste liquor to give it bulk and friability in a solid content of which a sufficient amount is inorganic material, so that it can be burned in a fluidized bed-type furnace. A waste fed to the furnace having a solid content of which 50 to 80 percent is inorganic is satisfactory. A furnace of this type will accept a certain amount of sodium compounds without slagging and permits one to use a certain amount of sodium hydroxide along with a magnesium hydroxide to raise the pH of the cooking liquors in the reaction chamber. This is of special advantage where one desires to reduce the water content of the liquor by means of filtering, because the sodium compounds are more water soluble, so that the carrier and organic compounds can be separated by a mechanical means such as a filter, centrifuge, clarifier or the like from the cooking chemical constituents of the liquor prior to burning. The carrier and organic compounds are then burned and the cooking chemical reclaimed In FIGURE 6 the numeral 628 refers to a filter which might optionally be used to separate the carrier and the organic materials which together form a separable complex from the cooking chemical constituents of the liquor. The carrier and organic materials are burned and the cooking chemical constituents are passed around the furnace and conducted directly to the mixer 624 where they are united with the furnace ash which consists essentially of carrier.

*Example 7*

This example, together with FIGURE 7, describes the alternative method of treating recovery waste liquor from a sodium base sulfite pulping operation.

FIGURE 7 shows a flow sheet for processing a sodium base sulfite waste liquor and the elements that are similar numerals except as to first digit. The treatment of the furnace ash is somewhat different due to the solubility of the sodium compounds present. Sodium salts being soluble in water, the solid ash output from the furnace can be mixed with water in a mixer 723 and filtered in a filter 724 to remove the carrier. The carrier, of course, is not soluble in water and is separated by the filter 724 from which it can be returned to the mixer 716. The sodium salts are then reclaimed in accordance with standard procedure and recirculated. The sodium salts are mainly in the form of sodium oxide or sodium sulfite as is well known in the art.

Numeral 728 refers to a mechanical separator that can optionally be used for the same purpose and in the same way as unit 628 of FIGURE 6.

Combinations of the bases described above and others are possible. In the case of an ammonium sulfite process where magnesium is in the system, the cooking liquors almost inevitably will contain a certain amount of magnesium base sulfite as well as ammonium base sulfide. Again, in many cases, by design the cooking liquor will contain more than one base. In such cases, it may be necessary to arrange for a combination of separating means involving the principles above. The basic feature of this invention is not the particular base used but the use of a carrier that will carry the organic materials of the waste and give the waste characteristics that permit it to be burned in a fluidized bed-type furnace.

The invention is not limited in its application to the processes described above. It applies equally well to the kraft process where the cooking medium is alkaline. It is not, therefore, intended that the foregoing should be read in a limiting sense.

While the invention has been described with reference to particular examples thereof, many alternatives, modifications, and variations will be apparent to those skilled in the art in light of the foregoing description. Accordingly, it is intended to embrace all such alternatives, modifications, and variations as fall within the spirit and broad scope of the appended claims.

I claim as my invention:

1. A method of treating the aqueous waste liquor from wood and similar cellulosic pulping operations wherein said waste liquor contains residues from the chemical digestion of lignin and hemicelluloses, as well as recoverable pulping chemicals, comprising: commingling with at least a portion of said waste liquor a substantial amount of an inorganic carrier in an amount sufficient to increase the inorganic content of the total solids in the waste liquor to within the range of about 5% to 70% and to raise the pH to within the range of about 8.5% to about 10.0%, thereby forming a separable solid complex of residues and carrier, said carrier being magnesium oxide, burning the combination of said waste liquor residues and inorganic carrier under oxidizing combustion conditions to substantially burn off organic material in said waste liquor residues and to reclaim said inorganic carrier as a furnace ash containing said carrier in the form of the oxide, and recycling at least a portion of said inorganic carrier to the commingling step.

2. Method of claim 1 including the step of evaporating a portion of the water from said aqueous waste liquor before adding said inorganic carrier.

3. Method of claim 1 wherein said method includes the steps of heating said waste liquor and said carrier at about 95 to about 105° C. for from about ten to about thirty minutes, physically separating said solid complex from the waste liquor and burning said solid complex.

4. Method of claim 1 wherein said waste liquor is the waste liquor from an ammonium base sulfite pulping operation containing ammonium lignosulfonate and ammonium bisulfite, and said method includes the steps of adding a sufficient amount of said inorganic carrier to the waste liquor to liberate the ammonia, collecting ammonia gas thereby evolved from said waste liquor, collecting sulfur dioxide gas evolved in the aforesaid step of burning said residue and said inorganic carrier, and combining said ammonia gas and said sulfur dioxide with water to provide ammonium bisulfite and sulfite cooking chemical.

5. Method of claim 1 wherein said waste liquor is the waste liquor from a magnesium base sulfite pulping operation, and said method includes the steps of collecting sulfur dioxide evolved in the aforesaid step of burning said residue and said inorganic carrier, and combining said sulfur dioxide with a portion of said reclaimed inorganic carrier and with water to provide magnesium bisulfite cooking liquor.

6. Method of claim 1 wherein said waste liquor is the waste liquor from a sodium base sulfite pulping operation, and said method includes the steps of collecting sulfur dioxide evolved in the aforesaid step of burning the said residue and said inorganic carrier, treating said furnace ash to recover sodium salts therefrom, and combining said sulfur dioxide with said sodium salts to provide sodium sulfite cooking liquor.

7. Method of claim 1 wherein said waste liquor is the waste liquor from a kraft pulping process.

8. In a method of treating an aqueous waste liquor from wood and similar cellulosic pulping operations wherein said waste liquor contains residues from the chemical digestion of lignin and hemicelluloses with a sulfite-containing cooking liquor, the improvement comprising: commingling with at least a portion of said waste liquor an amount of magnesium oxide sufficient to increase the inorganic content of the total solids in the waste liquor to within the range of about 5 to about 70 weight percent and in an amount sufficient to bring the pH within the range of about 8.5 to 10.0 to thereby form a separable solid complex of residues and magnesium oxide, burning the combination of said waste liquor residues and magnesium oxide in a combustion zone, to substantially burn off organic material in said waste liquor residues and to reclaim said magnesium oxide as a furnace ash, recovering sulfur dioxide from the effluent gases leaving said combustion zone, recovering magnesium oxide from the combustion zone, and recycling at least a portion of said magnesium oxide to the commingling step.

9. A method of treating the aqueous waste liquor from wood and similar cellulosic pulping operations wherein said waste liquor contains residues from the magnesium bisulfite digestion of lignin, and hemicelluloses as well as recoverable magnesium and sulfite pulping chemicals, comprising: commingling with at least a portion of said waste liquor a magnesium oxide carrier in an amount sufficient to increase the inorganic content of the total solids in the waste liquor to within the range of about 5 to about 70 weight percent, thereby forming a separable solid complex of residues and carrier at a pH within the range of about 8.5 to 10.0; separating said separable solid complex from the mother liquor; burning the separated solid complex of said waste liquor residues and carrier under oxidizing combustion conditions to substantially burn off organic materials in said waste liquor residues, to reclaim said carrier as magnesium oxide, and to regenerate sulfur dioxide gas; recycling a portion of said reclaimed magnesium oxide to the commingling step to serve as carrier; and combining said regenerated sulfur dioxide gas with a second portion of said reclaimed magnesium oxide and with water to provide magnesium bisulfite cooking liquor.

10. A method of treating the aqueous waste liquor from wood and similar cellulosic pulping operations wherein said waste liquor contains residues from the sodium base sulfite digestion of lignin and hemicelluloses as well as recoverable sodium and sulfite pulping chemicals, comprising: commingling with at least a portion of said waste liquor a magnesium oxide carrier in an amount sufficient to increase the inorganic content of the total solids in the waste liquor to within the range of about 5 to about 70 weight percent, thereby forming a separable solid complex of residues and carrier at a pH within the range of about 8.5 to 10.0; separating said separable solid complex from the mother liquor; burning the separated solid complex of said waste liquor residues and carrier under oxidizing combustion conditions to substantially burn off organic material in said waste liquor residues, to produce a furnace ash containing magnesium oxide carrier and sodium salts, and to regenerate sulfur dioxide gas; recycling a portion of said furnace ashes to the commingling step to serve as carrier; treating at least a portion of said furnace ash to recover sodium salts therefrom; and combining said recovered sodium salts, said regenerated sulfur dioxide, and water to provide a sodium base sulfite cooking liquor.

11. A method of treating the aqueous waste liquor from wood and similar cellulosic pulping operations wherein said waste liquor contains residues from a kraft digestion of lignin and hemicelluloses as well as recoverable sodium and sulfur pulping chemicals, comprising: commingling with at least a portion of said waste liquor a magnesium oxide carrier in an amount sufficient to increase the inorganic content of the total solids in the waste liquor to within the range of about 5 to about 70 weight percent, thereby forming a separable solid complex of residues and carrier at a pH within the range of about 8.5 to 10.0, separating said separable solid complex from the mother liquor; burning the separated solid complex of said waste liquor residues and carrier under oxidizing combustion conditions to substantially burn off organic material in said waste liquor residues, and to form sodium sulfate and sodium carbonate; reducing said sodium sulfate to sodium sulfide; recycling a portion of said reclaimed magnesium oxide to the commingling step to serve as carrier; converting said sodium carbonate to sodium hydroxide; and combining said sodium sulfide and said sodium hydroxide and with water to provide kraft cooking liquor.

(References on following page)

References Cited by the Examiner

UNITED STATES PATENTS

| | | | |
|---|---|---|---|
| 2,385,955 | 12/1945 | Tomlinson | 162—36 |
| 2,596,241 | 5/1952 | Helleur | 162—32 |
| 2,644,748 | 7/1953 | Cunningham | 162—36 |
| 2,716,589 | 8/1955 | Byrns | 162—36 |
| 2,752,243 | 6/1956 | Barton et al. | 162—32 |
| 3,111,378 | 11/1963 | Mugg | 23—48 |

FOREIGN PATENTS 619,686  5/1961  Canada.

S. LEON BASHORE, *Acting Primary Examiner.*

DONALL H. SYLVESTER, *Examiner.*